US005486841A

United States Patent [19]

Hara et al.

[11] Patent Number: 5,486,841
[45] Date of Patent: Jan. 23, 1996

[54] GLASSES TYPE DISPLAY APPARATUS

[75] Inventors: Nobuyuki Hara; Akira Kawamura, both of Kanagawa; Takeshi Matsui, Tokyo, all of Japan

[73] Assignee: Sony Corporation, Tokyo, Japan

[21] Appl. No.: 76,953

[22] Filed: Jun. 15, 1993

[30] Foreign Application Priority Data

Jun. 17, 1992 [JP] Japan .................................. 4-158262
Jun. 22, 1992 [JP] Japan .................................. 4-162969

[51] Int. Cl.$^6$ .................................................. G09G 5/00
[52] U.S. Cl. ............................ 345/8; 345/9; 359/462
[58] Field of Search ........................... 359/13, 630, 631, 359/632, 462, 464, 466, 471, 473, 477; 345/7, 8, 9; 358/87, 88, 93

[56] References Cited

U.S. PATENT DOCUMENTS

| | | | |
|---|---|---|---|
| 770,470 | 9/1904 | Mills | 40/455 |
| 2,955,156 | 10/1960 | Heilig | 358/88 |
| 3,712,714 | 1/1973 | Uyeda | 345/8 |
| 3,945,716 | 3/1976 | Kinder | 340/980 |
| 4,021,846 | 5/1977 | Roese | 358/92 |
| 4,048,653 | 9/1977 | Spooner | 345/8 |
| 4,156,292 | 5/1979 | Helm | 345/8 |
| 4,190,856 | 2/1980 | Ricks | 358/88 |
| 4,494,837 | 1/1985 | Bommarito | 351/204 |
| 4,550,984 | 11/1985 | Raymond | 345/7 |
| 4,636,866 | 1/1987 | Hattori . | |
| 4,969,714 | 11/1990 | Fournier | 345/8 |
| 4,982,278 | 1/1991 | Dahl | 358/88 |
| 5,034,809 | 7/1991 | Katoh . | |
| 5,093,567 | 3/1992 | Staveley | 345/8 |
| 5,125,733 | 6/1992 | Lee | 359/462 |
| 5,281,957 | 1/1994 | Schoolman | 345/8 |

FOREIGN PATENT DOCUMENTS

| | | |
|---|---|---|
| 0344881 | 12/1989 | European Pat. Off. . |
| 0438362 | 1/1991 | European Pat. Off. . |
| 0454443 | 10/1991 | European Pat. Off. . |
| 293459 | 11/1904 | France . |
| 2356970 | 1/1978 | France . |
| 2615633 | 11/1988 | France . |
| 8514538 | 7/1985 | Germany . |
| 1581926 | 12/1980 | United Kingdom . |
| 2206421 | 1/1989 | United Kingdom . |
| WO91/04508 | 4/1991 | WIPO . |

OTHER PUBLICATIONS

European Search Report, EP 93 40 1562, Oct. 24, 1994.
Eric. G. Rawson, "Vibrating vaifocal mirrors for 3-D imaging", IEEE Spectrum, vol. 6, No. 9, Sep. 1969, pp. 37–43.
Lindsay, R. B. "Physical Mechanics" 3rd Ed. Van Nostrand 1961. pp. 37–40, 404–412.

*Primary Examiner*—Ulysses Weldon
*Assistant Examiner*—Matthew Luu
*Attorney, Agent, or Firm*—Ronald P. Kananen

[57] ABSTRACT

A glasses type head mounted display apparatus for seeing a virtual image through left and right lens systems provided with corresponding left and right display portions displaying left and right pictures, respectively. The display apparatus includes left and right slide mechanisms for moving the respectively left and right display portions on the main point axes of the lens systems and on segment lines through the central points of the left and right lens systems and focuses of the left and right lens systems so that the user sees through the left and right lens systems a virtual image synthesized with pictures of the left and right display portions.

32 Claims, 21 Drawing Sheets

GLASSES TYPE DISPLAY APPARATUS

BACKGROUND OF THE INVENTION

1. Field of the Invention

This invention relates to a glasses type display apparatus, which displays a picture formed by computer graphics or the like, so that the user experiences a realization (the so-called virtual reality), as if the picture existed in a virtual region in a virtual image. The glasses type display apparatus which is called a head mounted display etc., has right and left display portions displaying left and right pictures respectively, so that the user sees through left and right lens systems a virtual image synthesized with pictures of these left and right display portions.

2. Description of the Related Art

In recent years, a stereoscopic (or three-dimensional effect) television using a lens and a liquid crystal panel or the like has been proposed (see U.S. Pat. No. 4,636,866 (Japanese Patent Laid-Open Gazette No. 117889/1984)). A fundamental principle of such previously-proposed liquid crystal stereoscopic television will be described with reference to FIG. 1.

Referring to FIG. 1, there is shown a convex lens P6 which is composed of a plurality of lenses in actual practice, and a light-transmission-type liquid crystal display P7 is supported in front of the convex lens P6 by a supporting device P8 together with the convex lens P6 to thereby display a video image on a display screen P9 of the liquid crystal display P7. The liquid crystal display P7 is disposed within a focal length F of the convex lens P6. Also, an eye P5 is distant from the convex lens P6 by a distance of 10 to 30 [mm] in the opposite side of the transmission-type liquid crystal display P7.

With the above arrangement, the transmission-type liquid crystal display P7 is disposed within the focal length F of the convex lens P6 so that, when the viewer peeps at a video image on the display screen P9 of the transmission-type liquid crystal display P7 from the eye P5 side through the convex lens P6, the display being illuminated by natural light or guided light P10, the viewer can watch a virtual image P4 in the enlarged form at the position distant from the actual position in which the video image is displayed on the display screen P9.

FIG. 2 is a plan view of the optical system of FIG. 1. As shown in FIG. 2, left and right convex lenses P6L and P6R for magnification are respectively disposed between left and right eyes P5L, P5R and left and right transmission-type liquid crystal displays P7L, P7R, whereby video images displayed on the left and right transmission-type liquid crystal displays P7L, P7R are magnified and also stereoscopic virtual images are displayed on left and right virtual image planes P4L, P4R, respectively.

In the conventional virtual image display device of lens magnification type shown in FIGS. 1 and 2, the left and right convex lenses P6L, P6R are located very close to the left and right eyes P5L, P5R. Thereby, when the viewer wears the virtual image display of this arrangement, the viewer cannot see the view of the surroundings without taking off such virtual image display device, which is very dangerous.

Further, there is a conflict between inclinations (congestion angles) of the left and right eyes P5L, P5R and the focusing adjustment of crystalline lenses thereof. More specifically, video images on the left and right virtual image planes P4L, P4R viewed by the left and right eyes P5L, P5R shown in FIG. 2 must coincide with each other. Whereas, a distance $L_1$ between the human left and right eyes P5L and P5R is not always the same so that a length $L_2$ between the left and right convex lenses P6L and P6R must be moved or adjusted. If the length $L_2$ is changed, the positions of video images displayed on the left and right virtual image planes P4L, P4R will be displaced. FIG. 3 is a schematic diagram used to explain an example such that the video images displayed on the left and right virtual image planes P4L, P4R are displaced in position. In FIG. 3, the virtual image plane P4L is for the left eye and the virtual image plane P4R is for the right eye, and a predetermined point $PA_L$ on the virtual image plane P4L viewed by the left eye P5L and a predetermined point $PA_R$ on the virtual image plane P4R viewed by the right eye P5R should have been displayed at the same position, inherently.

When the viewer watches such an object by this virtual display, inclinations of left and right eyes become θA and θB, which means that the viewer watches a hypothetical point PA on a plane $S_1$. On the other hand, the left and right eyes P5L, P5R are focused on the points $PA_R$, $PA_L$ on the virtual image planes P4R, P4L so that the focused states of crystalline lenses and the inclination angles of both eyes are not coincident, thereby viewer's eyes being fatigued.

In the glasses type display apparatus of such a construction, since the user sees through the left and right lens systems, there is a problem of an incongruence of visibility between the lens systems and the user's eyes. For solving the incongruence of visibility, a visibility adjusting means has provided in the glasses type display apparatus.

This adjustment of visibility is ordinarily performed to bring the left and right display portions nearer to or farther from the left and right lens systems. In this case, the left and right display portions are provided on a single moving member to move together. Therefore, when adjusting a visibility, positions of virtual images $G_L$, $G_R$ are moved as shown in FIG. 4, as a result positions of the virtual images $G_L$ and $G_R$ do not coincide with each other.

In actual practice, even if the positions of the virtual images do not coincide, the user's eyes can view them with correction reaction so that these coincide each other. However, continuing to view with correction reaction for a long time, causes remarkable tension and its attendant ophthalmic fatigue or the like to the user. Thereby, there is a problem that it is caused to the user, such as, an amblyopia and a headache, which becomes a heavy burden to the user.

Generally, the spaces between left and right eyeballs of users, i.e., a distance between pupils, are different normally about 56 to 76 mm. In the glasses type display apparatus, a distance between the left and right lens systems must be adjusted corresponding to various distances between pupils among users. In this manner the display apparatus is more useful when adjusting the distance between lenses, if the adjusted distance between lenses, i.e. distances between pupils, can be easily checked from the outside without using a distance measuring instrument, such as a slide caliper and a ruler etc.

Similarly, if a virtual image display position which is adjusted corresponding to distances between left and right display portions and lenses, can be easily checked from the outside, its usefulness is improved; thus can be realized a convenient glasses type display apparatus in general.

Further, in the glasses type display apparatus used for virtual reality, the so-called goggle type construction as shown in FIG. 5A is ordinarily used. In this case, as shown in FIG. 5B, a space for inserting a pair of glasses within the goggle is provided, considering the user may be wearing glasses for correcting eyesight. However, in this case, when exchanging the glasses, the user must take off the glasses type display apparatus of goggle type construction every time, which is very troublesome.

Further, in the glasses type display apparatus of goggle type construction, because visual fields of the outside of the display portion are obstructed by the case, it is difficult and dangerous, for example, to walk wearing the glasses type display apparatus. Further, the user cannot see other displays while working, thereby if the user wants to see the other displays, the user must take the glasses off at once, thus there arises a problem that work efficiency is lowered.

SUMMARY OF THE INVENTION

In view of the foregoing, an object of this invention is to provide a glasses type display apparatus in which positions of left and right virtual images to be seen are so coincided as to improve the user's comfort and convenience in particular, even when adjusting visibility and a distance between pupils.

The foregoing object and other objects of the invention have been achieved by the provision of a glasses type display apparatus for seeing virtual images obtained through the left and right lens systems 2L, 2R, as shown in FIG. 10, in which: left and right display portions 1L, 1R are provided. Left and right lens systems 2L, 2R are respectively provided with respect to pictures displayed on the left and right display portions 1L, 1R.

In the glasses type display apparatus, the left and right lens systems 2L, 2R are moved symmetrically corresponding to a distance between pupils of the user. The left and right display portions 1L, 1R are each respectively moved, on a main point axis a of the left and right lens systems 2L, 2R and on a respective segment line F0 through a center point 0 of the left and right lens systems 2L, 2R and a focus F of the respective left and right lens systems 2L, 2R. Finally, the segment lines F0 are moved symmetrically with linkage to motions of the left and right lens systems 2L, 2R, so that the positions of the left and right virtual images to be seen coincide, regardless of a distance between pupils, even if distances between the left and right display portions 1L, 1R and the left and right lens systems 2L, 2R with visibility adjustment are changed.

A further aspect of this invention provides a glasses type display apparatus for seeing virtual images through the left and right lens systems 2L, 2R. Left and right display portions 1L, 1R are provided and the left and right lens systems 2L, 2R are respectively provided to receive images displayed on the left and right display portions 1L, 1R. In the glasses type display apparatus moving mechanisms 19L, 19R and 42L, 42R symmetrically move the left and right lens systems 2L, 2R corresponding to the distance between pupils. Left and right sliding mechanisms 29L, 29R and 41L, 41R slide along the segment line F0 through the center point 0 of left and right lens mechanisms 2L, 2R and the focus F of the left and right lens systems 2L, 2R, from the main point axis α of the left and right lens systems 2L, 2R. Linking mechanisms 36L, 36R, 38L, 38R and 39L, 39R for linking the left and right sliding mechanisms for the displays with the moving mechanisms 19L, 19R and 42L, 42R of the left and right lens systems 2L, 2R to move symmetrically toward the left and right so that left and right sliding mechanisms 29L, 29R and 41L, 41R are respectively kept along the segment line F0. In the glasses type display apparatus the left and right display portions 1L, 1R are respectively attached to the left and right sliding mechanisms 29L, 29R and 41L, 41R to move the left and right display portions 1L, 1R respectively on the segment line F0, so that the positions of the left and right virtual images to be seen are coincided, regardless of the distance between pupils, even if the distance between the left and right display portions 1L, 1R and the left and right lens systems 2L, 2R are changed with visibility adjustment.

A further aspect of this invention provides pupil distance scale means 55 and 56 for displaying the distance between pupils corresponding to symmetric movement of the left and right lens systems 2L, 2R. In addition, virtual image display position scale means 62 and 64 display positions of the virtual image, corresponding to movement of the left and right display portions 1L, 1R on the segment line F0 through the center point 0 of the left and right lens systems 2L, 2R and the focus F of the left and right lens systems 2L, 2R.

Furthermore, according to another aspect of this invention, an image display portion 71 houses the left and right display portions 1L, 1R and the left and right lens systems 2L, 2R rotatably around the eyeballs of the user along a rotation axis extending from the side of the user. Head fitting means 72 to 75 disposed in front and behind the image display portion movably hold the image display portion 71. The head fitting means 72 to 75 holds the image display portion 71 springable up above the user's eyes. Head fitting means 72 to 78 has weights 76 to 78 corresponding to the weight of the image display portion 71 behind the head.

With above constructions, the distance between pupils and visibility can be adjusted, and regardless of these adjustments, the positions of the left and right virtual images to be seen can be coincided, even when changing the distance between the left and right display portions 1L, 1R and the left and right lens systems 2L, 2R; thus a glasses type display apparatus is realized where fine images can be seen by general users. Further, the virtual image display position corresponding to adjusted distance between pupils and visibility is indicated on a scale to be checked from the outside.

Further, the head fitting means 72 to 75 is so constructed that the image display portion 71 can rotate at the temple and the center of eyeballs, thereby the user can see images at a natural position. Further, the whole image display portion 71 may be sprung up, so as to clear the user's vision and to allow the user to see the outside scene. Furthermore, the weights 76 to 78 are provided behind the head, so that burden to the user's head is reduced.

Another object of this invention is to provide a glasses type display apparatus in which an adjustment of visibility can be accurately done with simple construction, and the outside scene can be seen if necessary.

For solving this problem, in the glasses type display apparatus in this invention the left and right display portions 1L, 1R are provided and virtual images obtained through the left and right lens systems 2L, 2R are seen. The left and right display portions 1L, 1R are respectively moved, on the main point axis α and the segment line F0 through the center point 0 of the left and right lens systems 2L, 2R and the focus F of the respective left and right lens systems 2L, 2R. Positions of the left and right virtual images to be seen coincide, even if the distance between the left and right display portions 1L, 1R and the left and right lens systems 2L, 2R are changed with visibility adjustment.

According to a further aspect of this invention, in the glasses type display apparatus left and right display portions 1L, 1R are provided. Left and right lens systems 2L, 2R are respectively provided with respect to the images displayed on the left and right display portions 1L, 1R and virtual images obtained through the left and right lenses systems are seen. Sliding mechanisms 13L, 13R and 14L, 14R slide along the segment lines F0 through the center point of the left and right lens systems 2L, 2R and the focus of the left and right lens systems 2L, 2R, on the main point axis of the left and right lens systems 2L, 2R, are provided; the left and right display portions 1L, 1R are respectively attached to the left and right sliding mechanisms 13L, 13R and 14L, 14R; the left and right display portions 1L, 1R are respectively moved on the segment lines; thus, the positions of the left and right virtual images to be seen coincide, even if the distance between the left and right display portions 1L, 1R and the left and the right lens systems 2L, 2R are changed by visibility adjustment.

Furthermore, in this invention head fitting means for fitting the left and right display portions 1L, 1R and the lens systems 2L, 2R above the viewer's eyes; a beam splitter 3 located in front of the viewer's eyes with a slant of 45 degrees with respect to optical axes of the left and right lens systems 2L, 2R; and extinction means 4 located in front of the beam splitter 3, are provided.

In a further aspect of this invention, head fitting means 6 for fitting the left and right display portions 1L, 1R and the left and right lens systems 2L, 2R above the viewer's eyes; a beam splitter 3 located in front of the viewer's eyes with a slant of 45 degrees with respect to optical axes of the left and right lens systems 2L, 2R; and shutter means 16, 17 and 18 located in front and/or behind of the beam splitter 3 for shutting only the outside scene in an display area of the virtual image, are provided.

Furthermore, in this invention: the head fitting member 6 has a brim 7; the beam splitter 3 is located at a position lower than the brim 7 and distant from the viewer's face by a predetermined distance; the bottom of the beam splitter is covered with a bottom face 5A extending along the enclosure 5; and the bottom face 5A extends along the enclosure 5 to be coincident with the eye direction of the viewer's eyes.

With the above construction, the left and right display portions 1L, 1R are respectively attached to the left and right sliding mechanisms 13L, 13R and 14L, 14R which slide along the segment lines F0 through the center point 0 and the focus F of the respective left and right lens systems 2L, 2R, on the main point axis α of the left and right lens systems 2L, 2R; the left and right display portions 1L, 1R are respectively moved on the segment line. Thus, the positions of the left and right virtual images to be seen coincide, even if the distance between the left and right display portions 1L, 1R and the left and right lens systems 2L, 2R are changed by visibility adjustment.

Further, by means of the head fitting member 6, the left and right display portions 1L, 1R and the left and right lens systems 2L, 2R are fitted above the viewer's eyes; thereby, allowing the user to exchange glasses while using the apparatus. The distinction means 4 and the shutter means 16, 17 and 18 are so provided that the lower scene of the view field and the outside scene of the virtual image display area are obtained. Thus, it is possible that the user can walk and see other displays or the like in working, if necessary.

DETAILED DESCRIPTION OF THE EMBODIMENT

Preferred embodiments of this invention will be described with reference to the accompanying drawings:

(1) First Embodiment (1-1) Configuration of Glasses Type Display Apparatus

Figure 1:
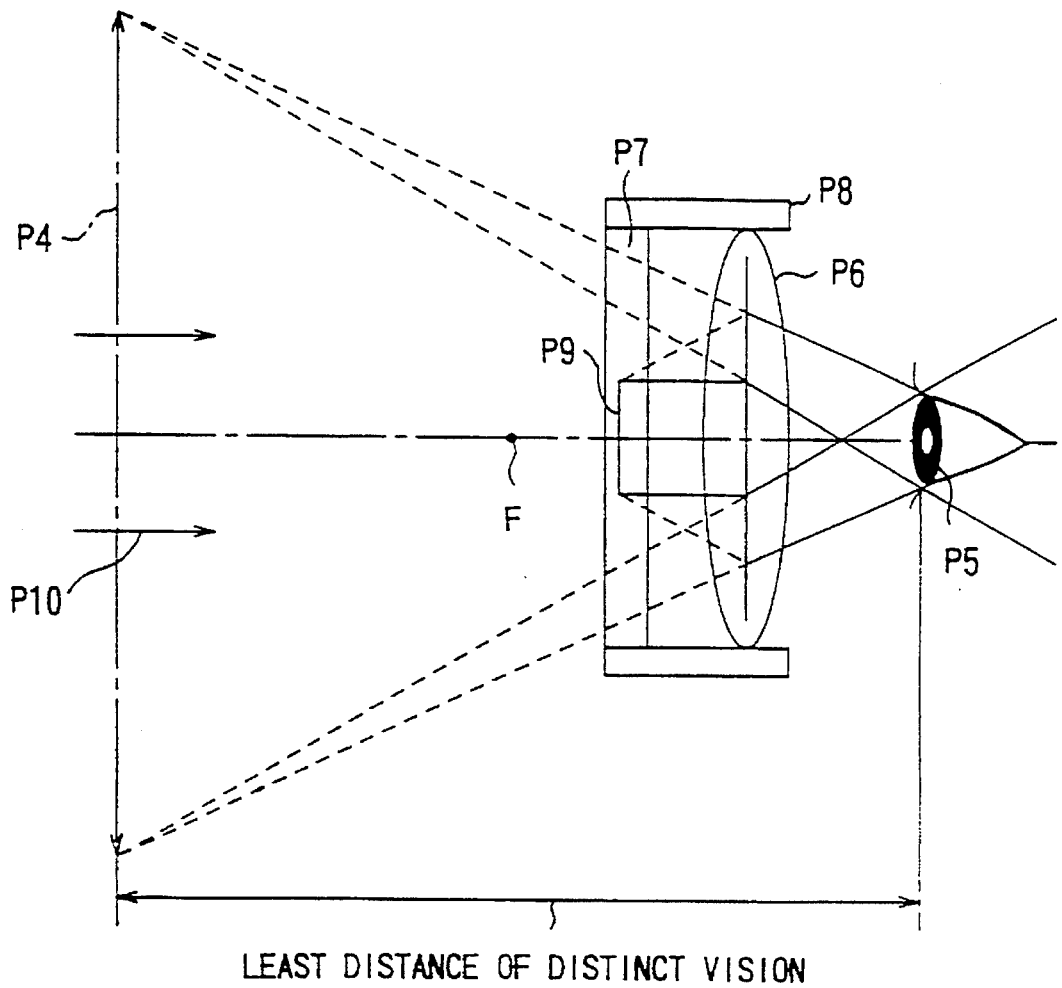
FIG. 1 is a schematic diagram used to explain a fundamental principle of a conventional liquid crystal stereoscopic viewing device.
Figure 2:
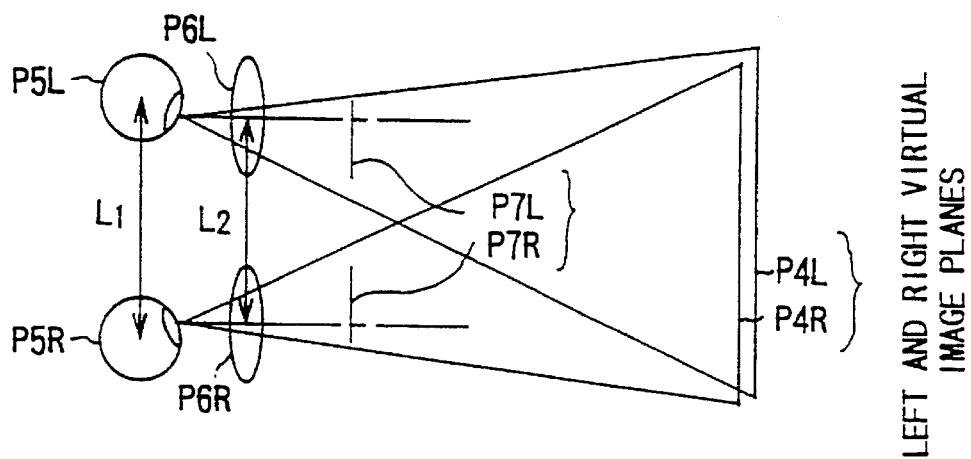
FIG. 2 is a plan view of the conventional liquid crystal stereoscopic viewing device.
Figure 3:
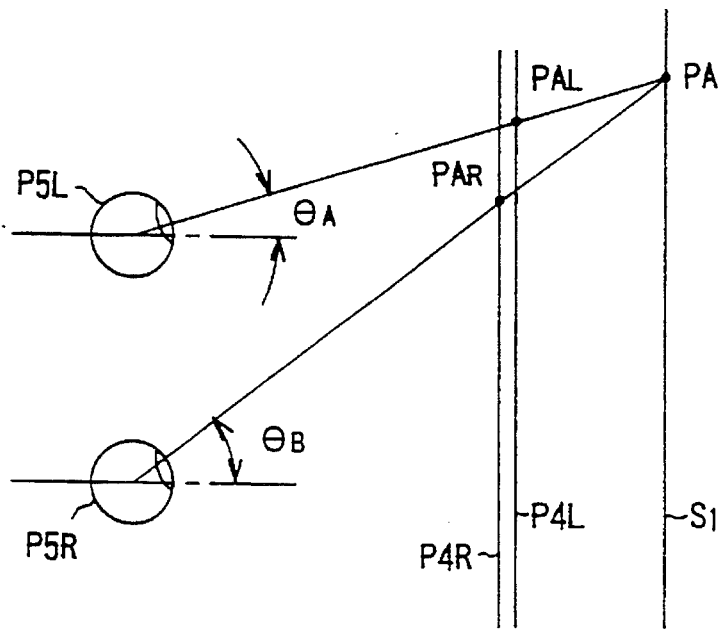
FIG. 3 is a schematic diagram used to explain a displacement of left and right virtual planes.
Figure 4:
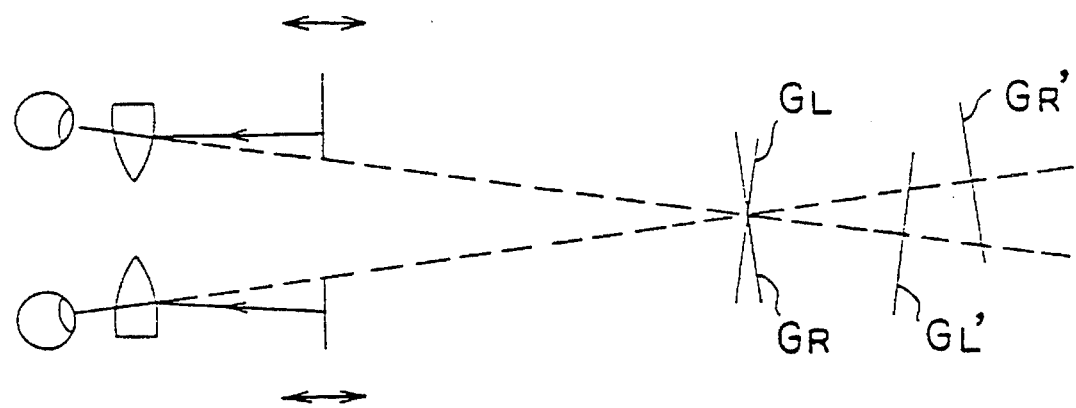
FIG. 4 is a schematic diagram explaining a movement of the virtual image with visibility adjustment in a conventional glasses type display apparatus.
Figure 20:
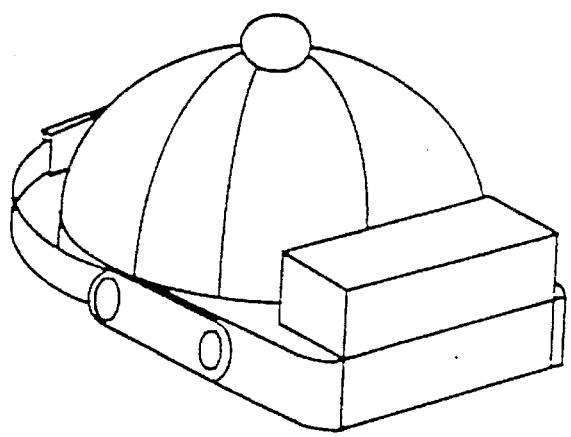
FIG. 20 is a schematic perspective view showing a head fitting member of the first embodiment.
Figure 5A:
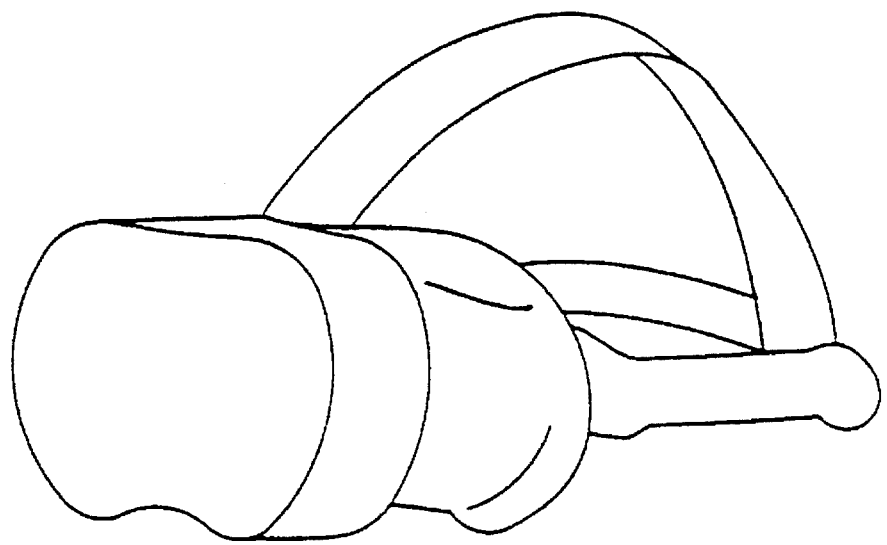
FIGS. 5A and 5B are schematic diagrams explaining a conventional glasses type display apparatus.
Figure 5B:
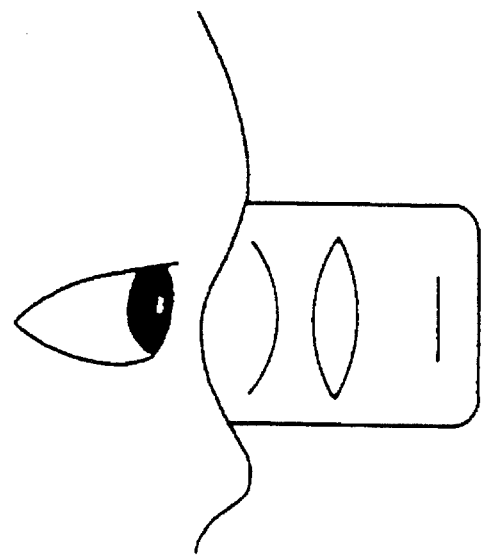
Figure 6:
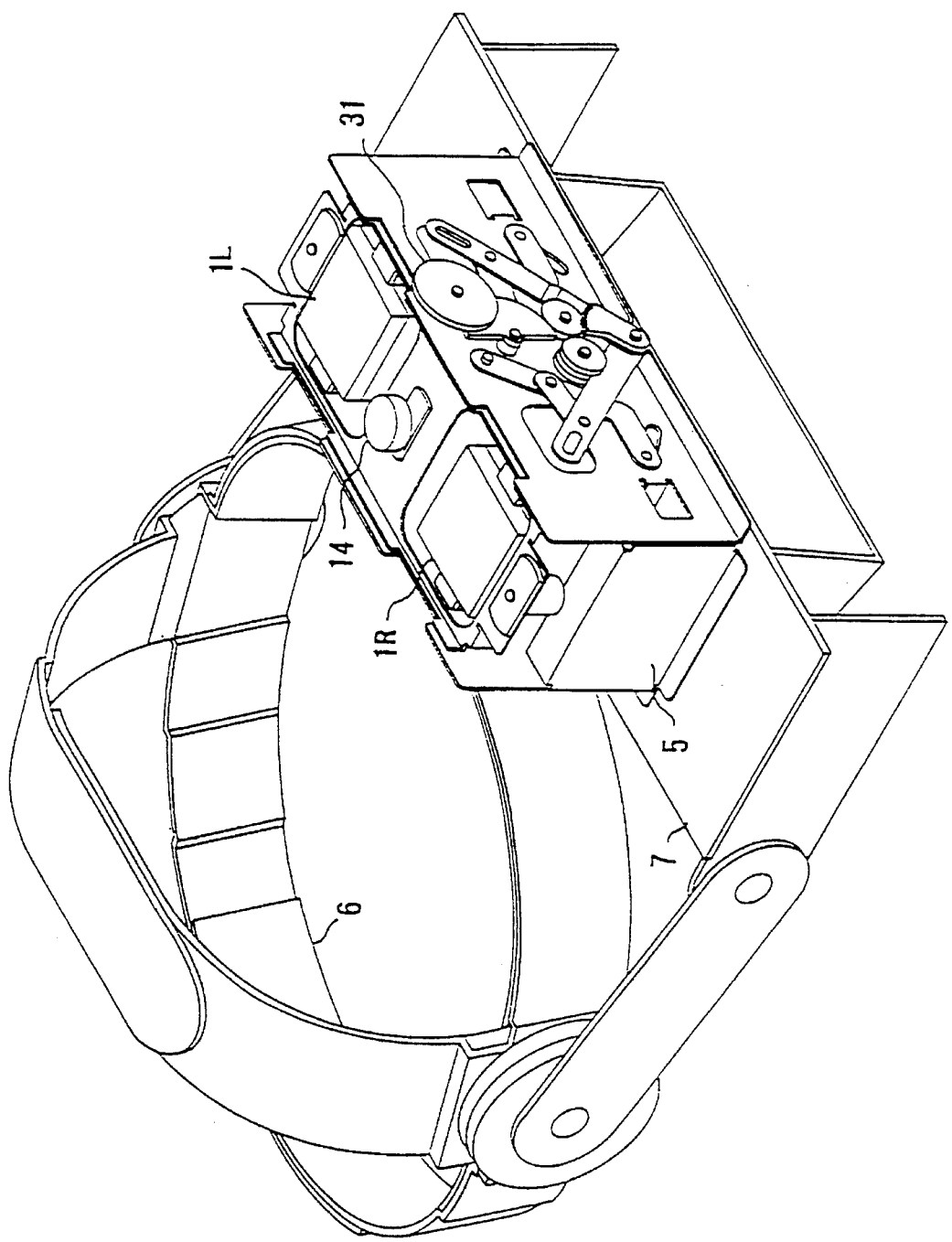
FIG. 6 is a perspective view showing an exterior of the first embodiment of the glasses type display apparatus according to this invention.
Figure 7:
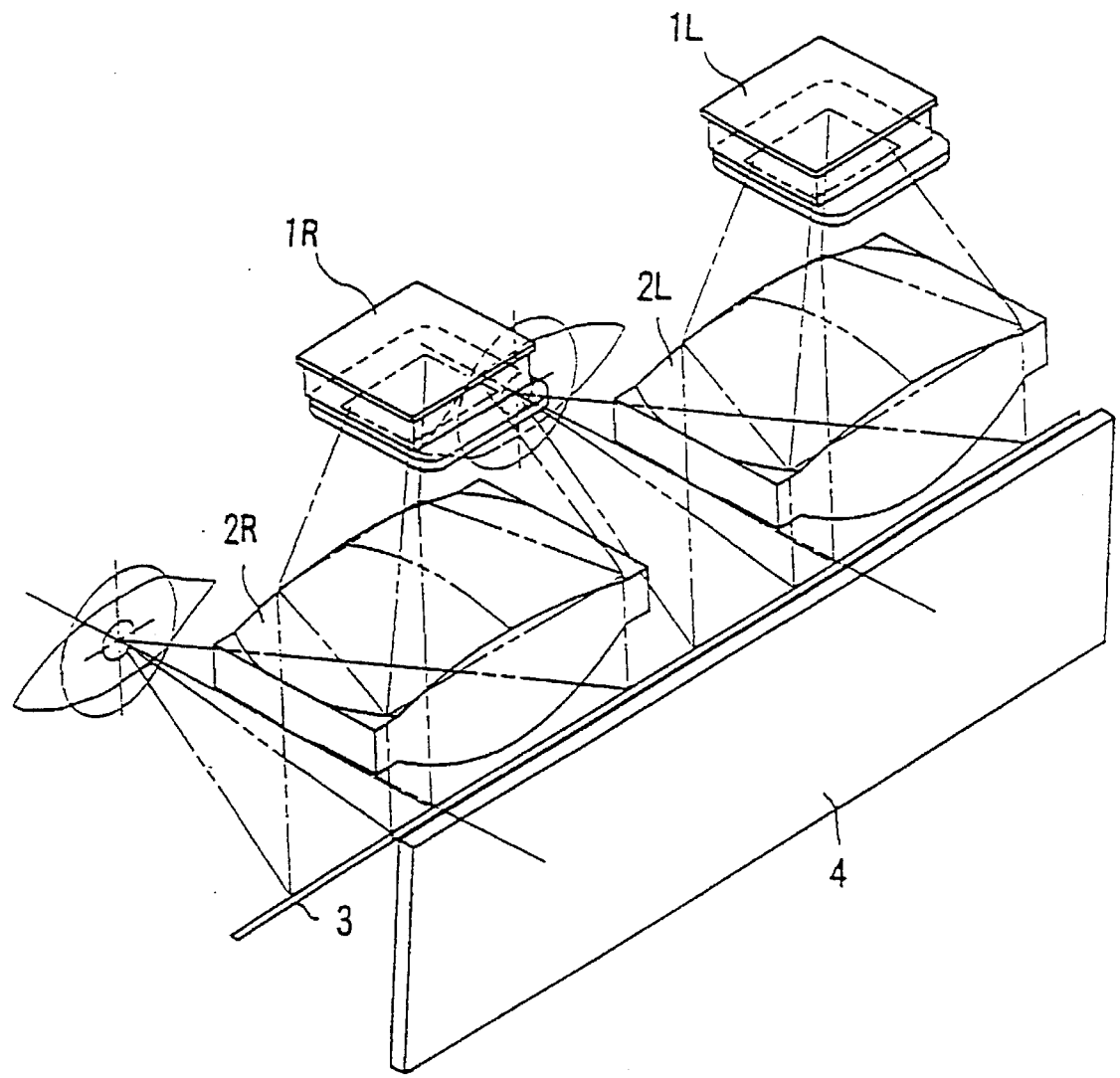
FIG. 7 is a perspective view explaining the optical system of the glasses type display apparatus.
Figure 8:
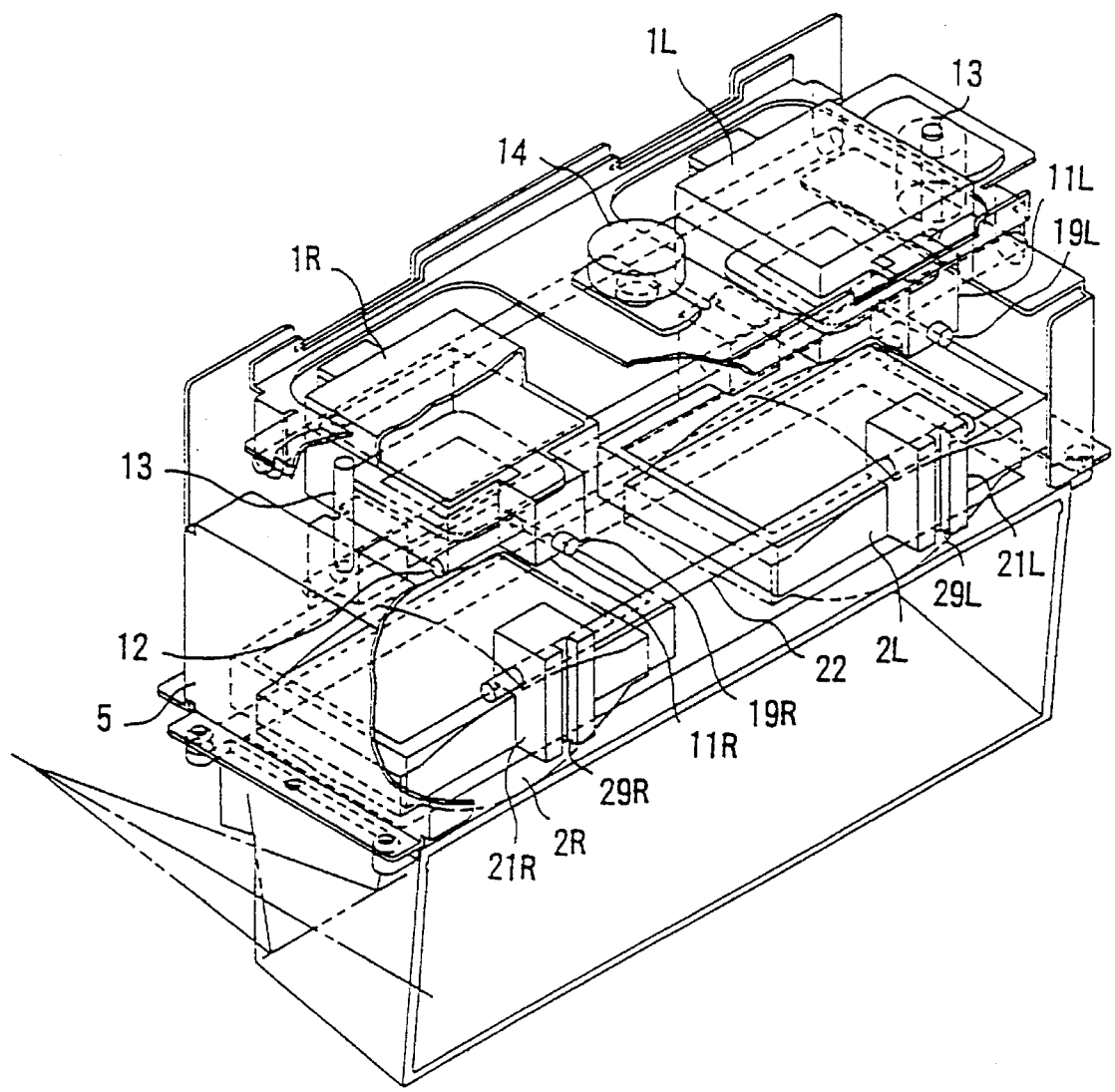
FIG. 8 is a perspective view explaining an arrangement of mechanisms of the glasses type display apparatus.
Figure 9:
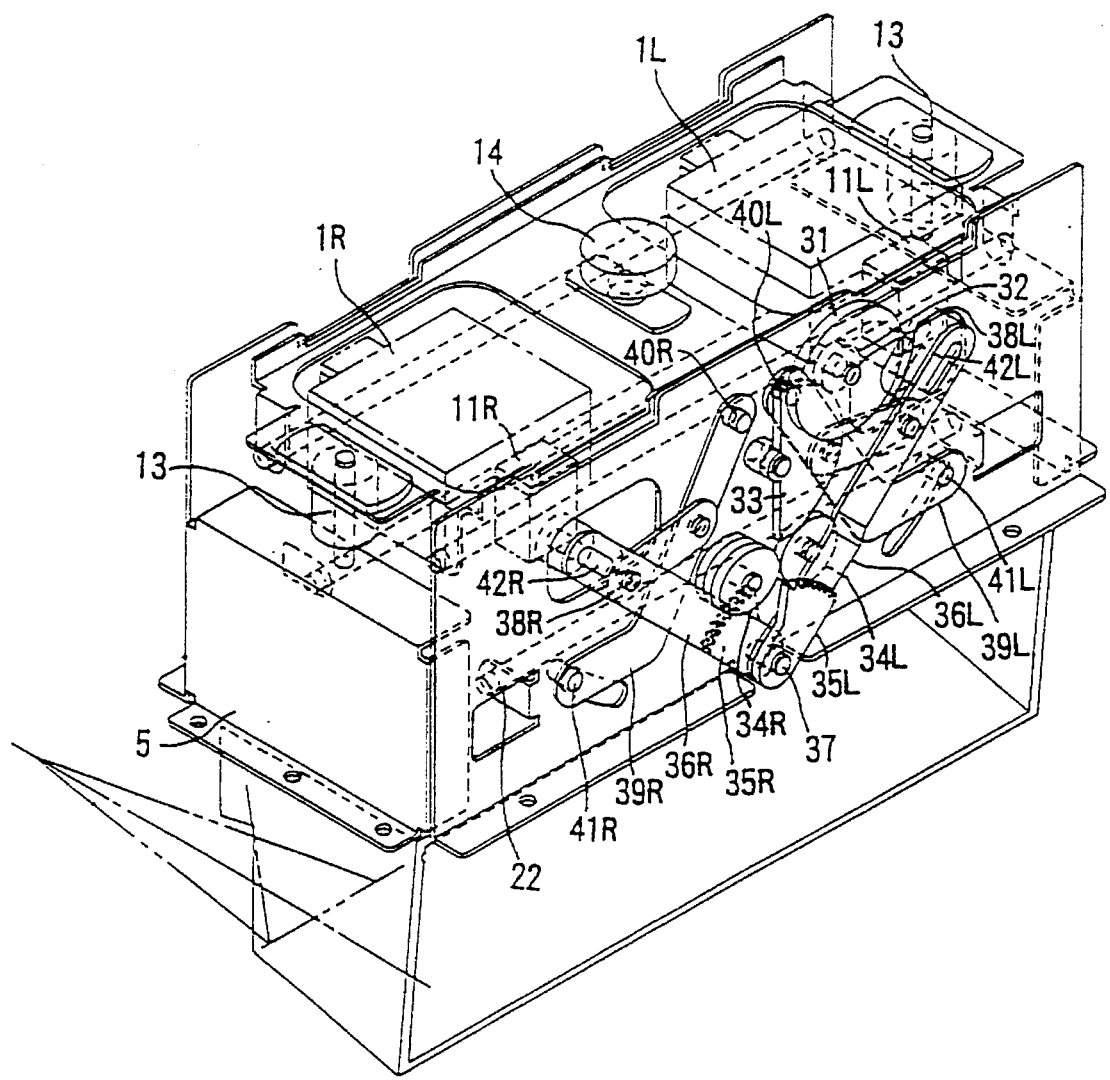
FIG. 9 is a perspective view explaining an exterior of the mechanism portion of the glasses type display apparatus.

FIG. 6 generally shows an exterior of the glasses type display apparatus of this invention, FIG. 7 shows its optical system, FIG. 8 shows the arrangement of the mechanisms, and FIG. 9 illustrates an exterior of the mechanisms. In FIGS. 6 to 9, the left and right lens systems 2L, 2R are respectively provided corresponding to left and right display portions 1L, 1R which are respectively combined with a back light and a liquid crystal display panel. Light along the optical axes of these lens systems 2L, 2R is reflected by a beam splitter 3 with a slant of 45 degrees, and enters the user's left and right eyeballs. A liquid crystal shutter 4 is placed as an extinction means in front of the beam splitter 3.

The left and right display portions 1L, 1R, the left and right lens systems 2L, 2R, the beam splitter 3, and the liquid crystal shutter 4 are constructed in an enclosure 5. This enclosure 5, inside of which is made of a material painted frosted black to intercept light, is provided on a holder table 7 in front of a head fitting member 6. The user wearing this head fitting member 6 on his head can see a virtual image.

The left and right display portions 1L, 1R, and the left and right lens systems 2L, 2R are provided on the upper side of the holder table 7, and the beam splitter 3 and the liquid crystal shutter 4 are provided on the lower side of it. In FIG. 6, a case on the upper side of the holder table 7, and the outside portions of the glasses type display apparatus are omitted.

The left and right display portions 1L, 1R are fixed to linear sliders 11L and 11R as shown in FIG. 8. These linear sliders 11L and 11R are attached to a common slider shaft 12, so that the left and the right display portions 1L, 1R move left and right. Note that, pins 19L and 19R connected to link mechanisms respectively, are provided to the linear sliders 11L and 11R.

Further, the left and right display portions 1L, 1R, the linear sliders 11L and 11R and the slider shaft 12, are moved up or down as a whole by the slider shaft 13. Note that, a dial 14 for visibility adjustment is provided at the center of the left and right display portions 1L, 1R. This dial 14 having a screw structure moves up or down the left and right display portions 1L, 1R, the linear sliders 11L and 11R and the slider shaft 12 as a whole with respect to the enclosure 5.

The lens systems 2L and 2R are respectively fixed to the linear sliders 21L and 21R. This linear sliders 21L and 21R are attached to a common slider shaft 22, in order to move left or right the left and right lens systems 2L, 2R. The slider shaft 22 is fixed to the enclosure 5, and the left and right lens systems 2L, 2R, the linear sliders 21L and 21R and the slider shaft 22, are fixed unmovably as a whole to the up or down direction with respect to the enclosure 5. In these linear sliders 21L and 21R, vertical grooves 29L and 29R connected to link mechanisms are respectively provided.

As shown in FIG. 6, a dial 31 for controlling a distance between pupils is located to the upper of center of the enclosure 5. A rotation of a gear 32 which is placed at the same shaft of this dial 31, is transmitted to drive gears 34L and 34R via a semicircular gear 33. These drive gears 34L and 34R are engaged each other, so as to rotatably move in inverse directions. Segment gears 35L and 35R are respectively engaged with the drive gears 34L and 34R.

Further, the first slide arms 36L and 36R are provided to the segment gears 35L and 35R in one body. One end of each slide arms 36L and 36R is supported rotatably to a common rotary shaft 37. The center portions of these slide arms 36L and 36R are respectively linked to the center portion of the second slide arms 39L and 39R via joint boards 38L and 38R. Further, one end of these slide arms 39L and 39R are respectively supported rotatably to rotary shafts 40L and 40R.

Slide pins 41L and 41R are respectively provided to the other end of this slide arms 39L and 39R, and are inserted to vertical grooves 29L and 29R which are provided to the linear sliders 21L and 21R as shown in FIG. 8. Long holes 42L and 42R are provided to the other ends of the slide arms 36L and 36R by the base line, to insert pins 19L and 19R provided to the linear sliders 11L and 11R.

Accordingly, when the user dials the dial 31, the slide arms 36L and 36R are rotated, and then the slide arms 39L and 39R are rotated via the joint boards 38L and 38R. Thereby, the linear sliders 21L and 21R are moved symmetrically via the slide pins 41L and 41R, so as to adjust a distance between pupils.

When the user dials the dial 14, the display portions 1L, 1R, the linear sliders 11L, 11R and the slider shaft 12 are moved up or down as a whole with respect to the enclosure 5. On the contrary, the lens systems 2L, 2R, the linear sliders 21L, 21R and the slider shaft 22 are fixed to the upper and lower portions of the enclosure 5, so that the left and right display portions 1L, 1R and the left and right lens systems 2L, 2R, move near to or away from each other, therefore a visibility can be adjusted.

Figure 10:
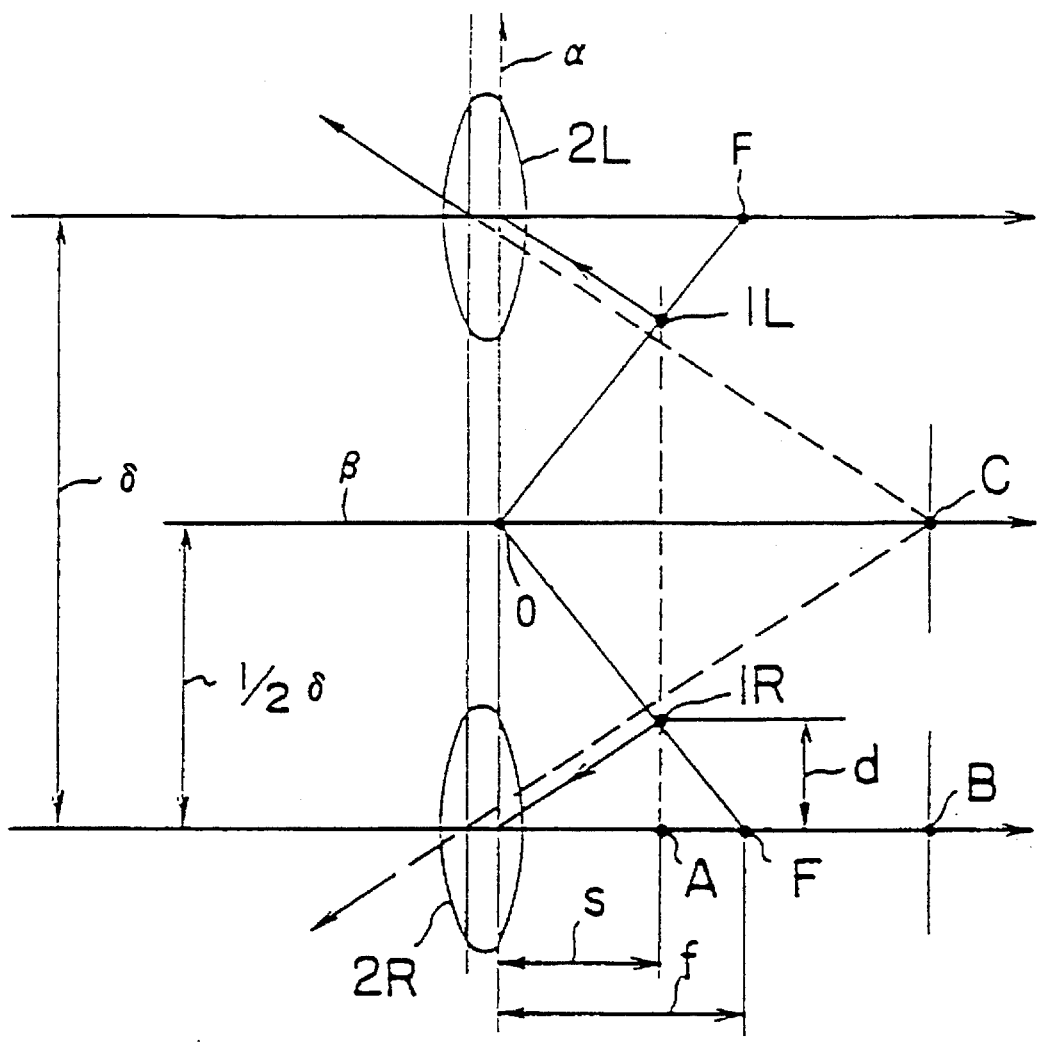
FIG. 10 is a schematic diagram explaining an optical system of visibility adjustment in the glasses type display apparatus.

When the left and right display portions 1L, 1R move up or down, the position thereof move left or right along the long holes 42L, 42R of the other ends of the slide arms 36L, 36R. Further, the rotary shafts 37 of the slide arms 36L, 36R coincides with a center point 0 on a main point axis of the left and right lens systems 2L, 2R as shown in FIG. 10. Link mechanisms of the slide arms 36L and 36R, the joint boards 38L and 38R and the slide arms 39L and 39R, are formed, as a base line passing through the focus F of the lens systems 2L, 2R.

Thereby, in this glasses type display apparatus, the left and right lens systems 2L, 2R move symmetrically corresponding to a distance between pupils, and then the left and right display portions 1L, 1R move on segment lines 0F through a center point 0 on the main point axis of the left and right lens systems 2L, 2R, and the focus F of the respective lens systems 2L and 2R.

FIG. 10 denotes an optical arrangement of the left and right display portions 1L, 1R, and the left and right lens systems 2L, 2R. Note that, a practical optical path is reflected by the beam splitter 3, however, in FIG. 10, the beam splitter 3 is omitted. In FIG. 10, for example, if placing a right display portion 1R at a point A, the center of a virtual image obtained as a result is formed at a point B on the optical axis of the right lens system 2R. Practically, in order to coincide with left and right virtual images, it is necessary to move the center of the virtual images at a point C. That is, if a distance between optical axes of the lens systems 2L and 2R are δ, it may be moved by δ/2.

If a distance between a center point A of the right display portion 1R and a main point axis α of the lens system 2R is "s", and if a distance between the main point axis α and the focus F is "f", a transversal magnification "m" of the virtual image is represented, as following equation:

$$m = \left| \frac{f}{s-f} \right| = \left| \frac{f}{f-s} \right| \qquad (1)$$

Accordingly, if a necessary amount of movement of the right display portion 1R is "d", the virtual image moves by m×d. Thereby, the amount of movement "d" satisfying the following equation:

$$m \times d = \frac{\delta}{2} \qquad (2)$$

The equation (2) is represented by the following equation:

$$d = \frac{\delta}{2} - \frac{\delta}{2f} \times s \qquad (3)$$

In FIG. 10, there is the segment line F0 between the focus F and the center point 0 on the main point axis α of the left and right lens systems 2L, 2R. This applies similarly to to the left display portion 1L and the left lens system 2L.

Then, in this glasses type display apparatus, the slider shafts 12 and 13 are provided to move the left and right display portions 1L, 1R along these segment lines F0, so that positions to see the left and right virtual images are coincided with each other, even if changing the distance between the left and right display portions 1L, 1R, and the left and right lens systems 2L, 2R, are changed by dialing the dial 31.

Further, when changing the distance between pupils by dialing the dial 31, the left and right lens systems 2L, 2R move symmetrically in the direction nearer to or further away from the center point 0 along the main point axis α. Thereby, the position of the focus F also moves in parallel with the main point axis α. In this case, the base lines of the slide arms 36L and 36R are also rotated to pass on the focuses of respective lens systems 2L, 2R, so that positions of the left and right virtual images to be seen are coincided with a center axis β which is orthogonal with the main point axis α and passes the center point 0.

On the above construction, the glasses type display apparatus can be realized, in which the distance between pupils can be adjusted, and positions of the left and right virtual images to be seen can be made to coincide with each other, even if changing distances between the left and right display portions 1L, 1R, and the left and right lens systems 2L, 2R, by adjusting the distance between pupils, so that a virtual image can be seen finely by any user.

Figure 11:
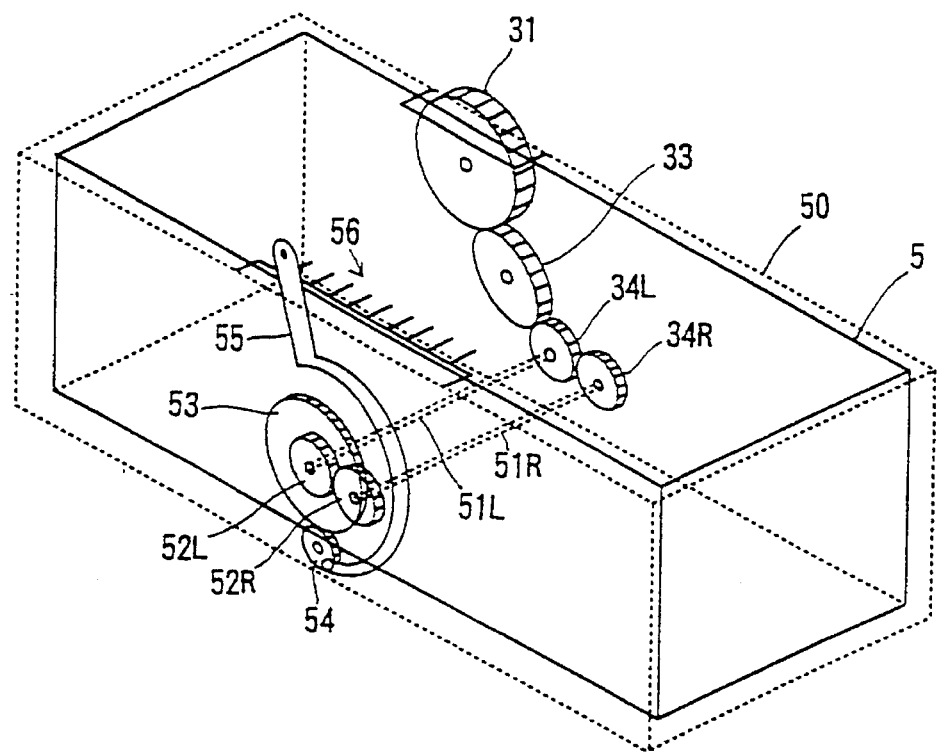
FIG. 11 is a schematic perspective view illustrating a configuration for indicating a distance between pupils in the glasses type display apparatus.
Figure 12:
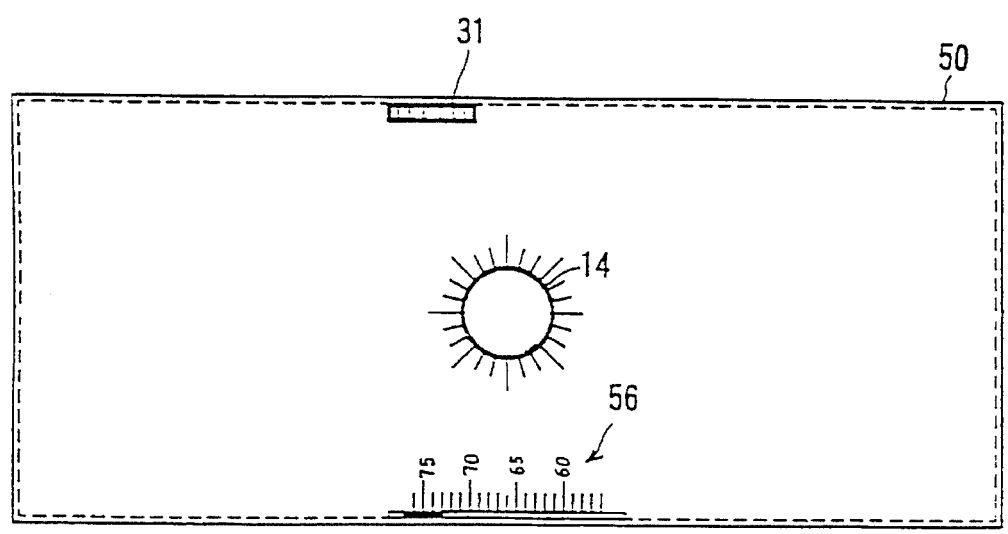
FIG. 12 is a plane view illustrating a configuration for indicating a distance between pupils in the glasses type display apparatus.
Figure 13:
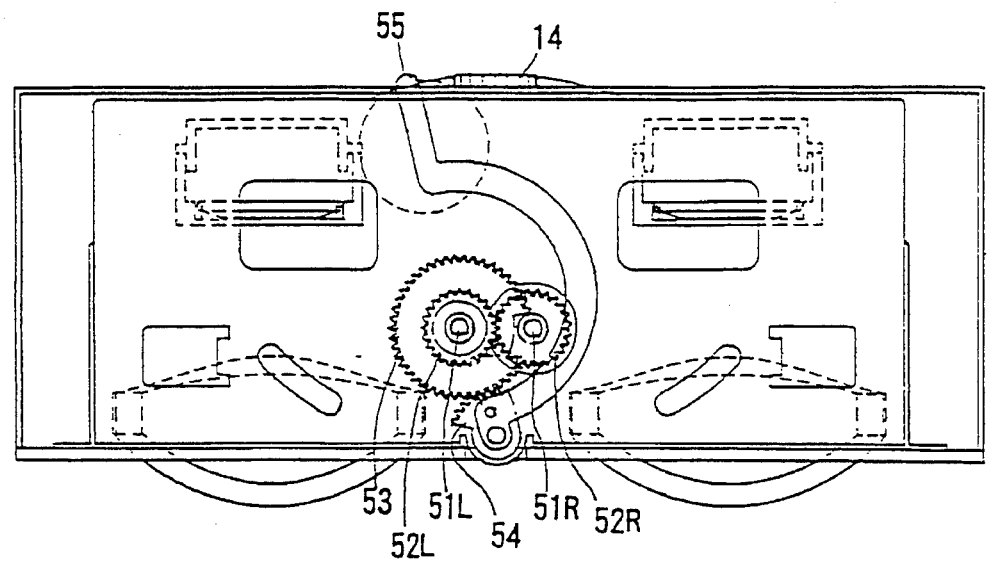
FIG. 13 is a rear view illustrating a mechanism for indicating a distance between pupils in the glasses type display apparatus.

(1-2) Configuration of Pupil Distance Display Portion and Virtual Image Display Portion In the glasses type display apparatus of this embodiment, as shown in FIGS. 11 to 13, when the distance between pupils is adjusted by rotating the dial 31 to adjust the distance between pupils, the adjusted distance between pupils can be displayed on a scale. Practically, as described above, when the dial 31 is rotated to adjust the distance between pupils, the semicircular gear 33 is rotated via the gear 32 fixed by same axis, thus this semicircular gear 33 and the drive gears 34L and 34R are rotated.

Drive gears 52L and 52R attached with a rear chassis of the enclosure 5 are driven by rotation of this drive gears 34L and 34R via shafts 51L and 51R. By rotation of this drive gears 52L and 52R, a segment gear 54 is rotated via a synchronization gear 53 fixed to one of the drive gears 52L on the same axis.

Corresponding to rotation of this segment gear 54, a scale indicating member 55 fixed to this segment gear 54 is moved to left or right. Practically, an end of the scale indicating member 55 projects slightly, from a long groove which is formed with the scale of distance between pupils 56 on the outside of the case 50, and moves to left or right by this long groove, so that the user can read the distance between pupils adjusted by rotation of the dial 31 for adjustment of distance between pupils from the outside, for example, as numerical values 56 to 76 mm.

Figure 14:
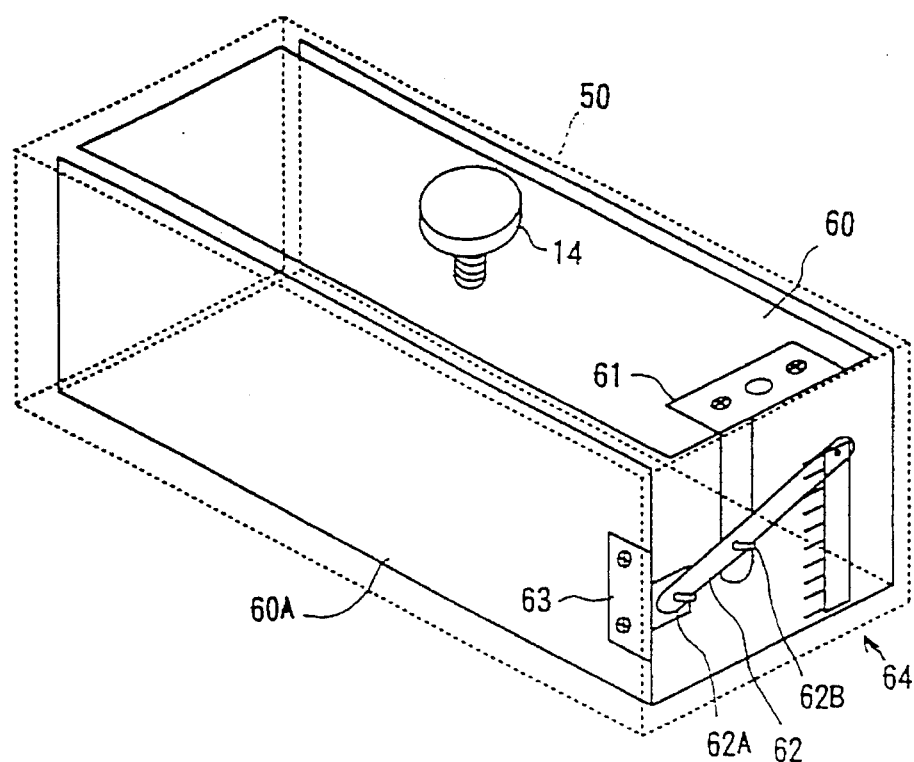
FIG. 14 is a schematic perspective view illustrating a configuration for indicating a virtual image display position in the glasses type display apparatus.
Figure 15A:
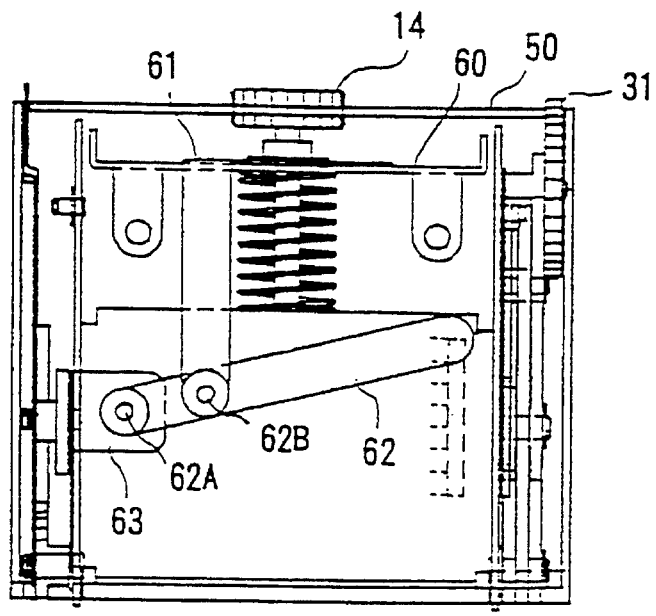
FIGS. 15A and 15B are side views illustrating a configuration for indicating a virtual image display position in the glasses type display apparatus.
Figure 15B:
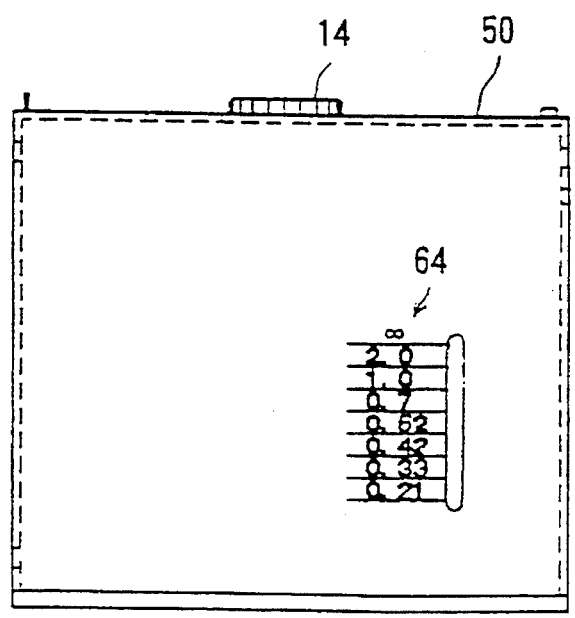

Further in the glasses type display apparatus of this embodiment, as shown in FIGS. 14, 15A and 15B, when adjusting visibility by rotating the dial 14 for position adjustment of virtual image (that is visibility adjustment), the position of the virtual image corresponding to the adjusted visibility can be displayed on the scale of the virtual image display position. That is, when the dial 14 for position adjustment of the virtual image is rotated, the distance between the left and right display portions 1L, 1R and the left and right lens systems 2L, 2R is changed, so that the positions of virtual images displayed in front of the user are changed.

When dialing the dial 14, an attach board 60 of the left and right display portions 1L, 1R, and a scale side board 61 attached by screws to this attach board 60, are moved down. A virtual image position indicating board 62 is connected to a center of scale member 63 and the scale side board 61 respectively where is attached to a rear chassis 60A by connecting units 62A and 62B, and it can be rotated.

When moving down the scale side board 61, the virtual image position indicating board 62 rotates at the same time around the center of scale member 63, thus the scale indicating board moves up or down. An end portion of this scale indicating board can be seen from the outside through a long groove formed on the outside of the case 50 with the scale of virtual image position 64, to magnify slight amount of adjustment of the dial 14 for position adjustment of virtual image by any times, so that adjusted position of the virtual image can be easily read from the outside, for example, as numerical values 0.21 to ∞[mm].

With the above construction, a distance between lenses adjusted now is indicated on a scale able to be checked from the outside, by interlocking with a mechanism that is variable arrangements of the display portions 1L and 1R and the lens systems 2L and 2R corresponding to the distance between pupils, thereby every user can adjust accurately the distance between pupils and a distance between optical axes and the lens systems 2L and 2R. Thus an image can be seen with little lens aberration and little distortion.

Further, as described in the above construction, by interlocking with a mechanism which can vary the position of the virtual image corresponding to the distance between the display portions 1L, 1R and the lens systems 2L, 2R, the set virtual image display position is indicated on a scale able to be checked from the outside, so as to change the position of the virtual image. Therefore every one can adjust accurately the position of the image that he wants to see. Thereby, an improved glasses type display apparatus is realized which is expecially convenient to the user.

(1-3) Configuration of Head Fitting Member

Figure 16:
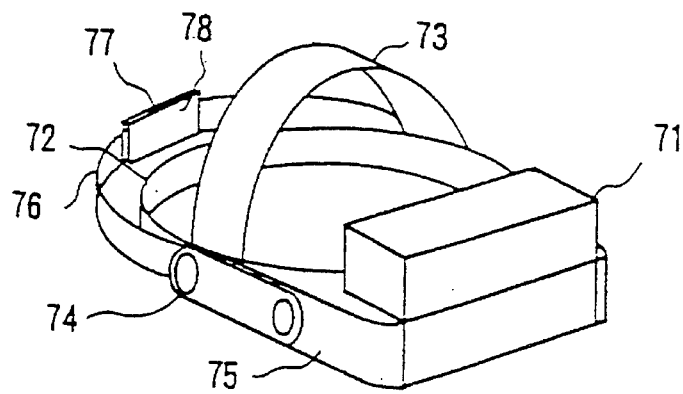
FIG. 16 is a schematic perspective view showing an exterior of the head fitting member of the glasses type display apparatus.

FIG. 16 shows a general configuration of head fitting member of the glasses type display apparatus of this invention, in which a weight balance portion is added to the configuration of FIG. 6. This glasses type display apparatus consists of an image display portion 71 as described above with regard to FIGS. 6 to 10, an image display portion support members 74 and 75, head fitting members 72 and 73, and weight balance portions 76, 77 and 78.

In this head fitting members 72 and 73, a periphery fixing band 72 fixes the glasses type display apparatus on the user's head, and its girth is variable correspond to a size and a shape of the user's head. A weight supporting band 73 is so provided that the glasses type display apparatus does not fall.

Figure 17A:
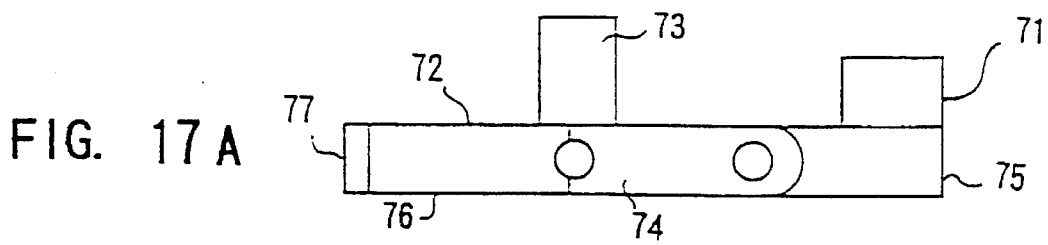
FIGS. 17A, 17B and 17C are schematic views explaining motions of the head fitting member of the glasses type display apparatus.

Further, in the image display portion support members 74 and 75, a mechanism supporting arm 74 is placed at the temple of the head fitting member 72 and is connected to be rotatable up or down. As shown in FIG. 17A, this mechanism supporting arm 74 can be sprung up so as not to obstruct to look at the outside scene while stopping to see. Further, the image display portion supporting arm 75 is connected to the mechanism supporting arm 74 at opposite side of the head fitting member 72.

Figure 17B:
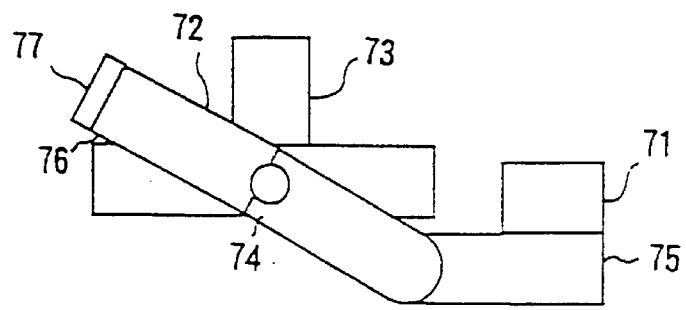
Figure 17C:
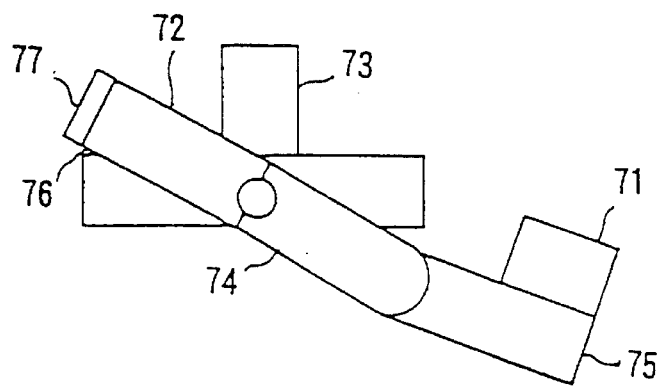

As shown in FIG. 17B, the image display portion supporting arm 75 is rotatable up or down around the rotation center coincident with the center of the eye viewed from the side direction. The image display portion 71 is constructed to move forward or backward. Practically, this mechanism supporting arm 74 is rotated to a position where the rotation center of the image display portion supporting arm 75 is brought up or down to coincide with the central eyeball. And then the image display portions supporting arm 75 is rotated, so that the image display apparatus 71 moves up or down around the eyeball as shown in FIG. 17C.

In this manner, by the mechanism supporting arm 74 and the image display portion supporting arm 75, the display position of the image can be rotated around the eyeball to keep a distance from the user's eyes to the image constant. By keeping the distance constant, images of the display portions 1L and 1R and the virtual image remain orthogonal to the user's eyes sight, therefore a distortion of shape of the image can be minimized. Further, the angle of the display portions can be easily set 0 to −30 degrees to the horizontal face, this angle being said the most suitable for seeing images, therefore the user's convenience can be improved.

The weight balance members 76, 77 and 78 consistent of a weight arm 76, a balance weight 77 and a weight cover 78. These weight balance members 76, 77 and 78 are constructed to move together with the mechanism supporting arm 74.

Figure 18:
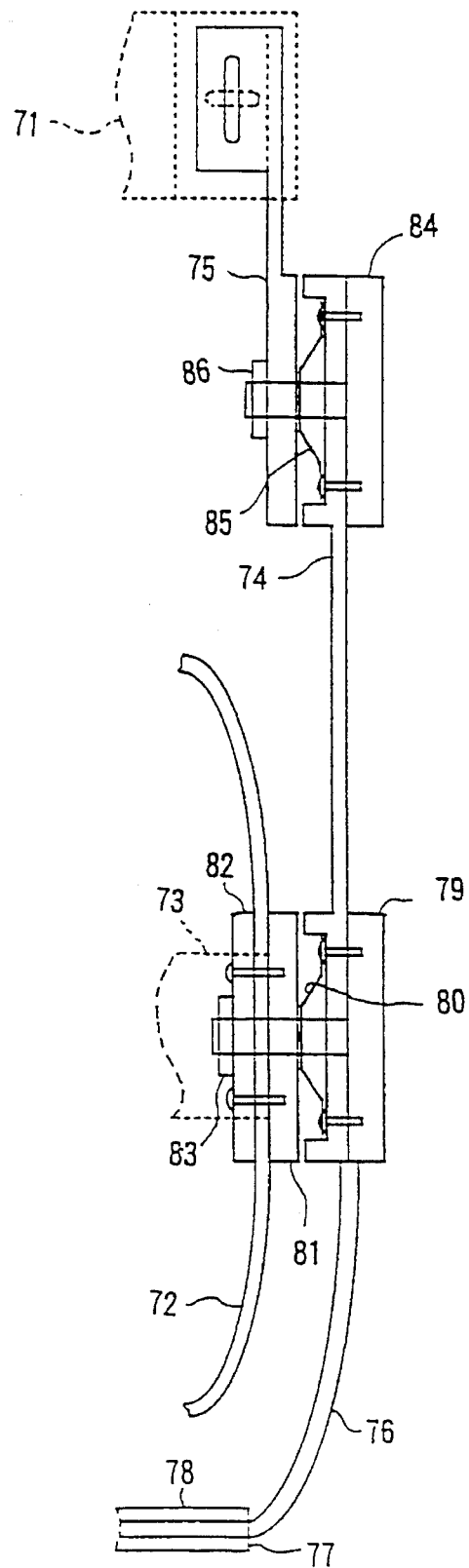
FIG. 18 is a cross-sectional view illustrating a configuration of the head fitting member of the glasses type display apparatus.
Figure 19:
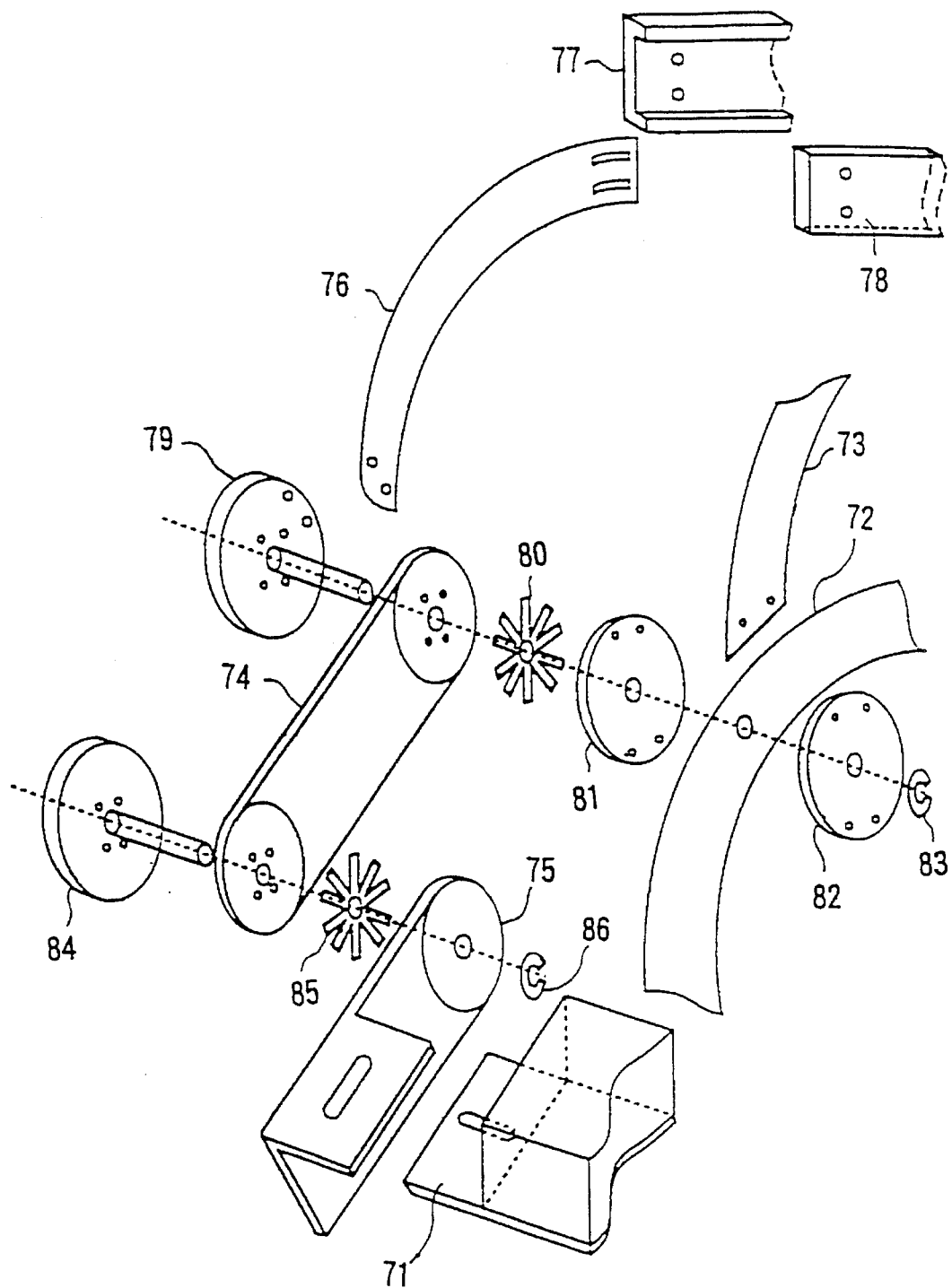
FIG. 19 is a disassembled perspective view showing a configuration of the head fitting member of the glasses type display apparatus.

Practically, in the image display portion supporting members 74 and 75, the head fitting members 72 and 73, and the weight balance members 76, 77 and 78, as shown in FIGS. 18 and 19, the peripheral fixing band 72 and the weight supporting band 73 are held by a band receiver 81 and a temple guard 82. A temple spring 80 is held between this portion and the system supporting arm 74, and is fixed by passing a temple shaft 79 and stopping them with a temple stopping ring 83.

In a portion corresponding to the center of an eyeball, an eyeball center spring 85 is held between the mechanism supporting arm 74 and an image portion supporting arm 75, and these are passed through by an eyeball center shaft 84. An eyeball center stopping ring 86 stops the shaft. In a connecting portion of a image portion supporting arm 75 and an image display portion 71, long holes are respectively provided on arm 75 and portion 71, the long holes being connected to each other by a screw. Thereby, the image display portion 71 can slide forward or backward, and left or right.

Regarding the weight balance members 76, 77 and 78, the weight arm 76 holds the balance weight 77 and the weight cover 78. The weight arm 76 has long holes, which allow the weight arm 76 to enlarge in length corresponding to the width of the user's head.

In the above construction, the image display portion rotates around the center of an eyeball allowing a natural image to be seen without distortion. The image display portion may be moved forward or backward so that a user can put the apparatus on without taking off his glasses. The image display portion 71 and the image display portion supporting arm 75 can be sprung up to see easily the outside scene. Further, a weight corresponding to the weight of the image display portion and the girth of the user's head is provided, to reduce fatigue by lightening the burden imposed on the user's head. Thus, a more convenient, improved glasses type display apparatus is realized.

(1-4) Other Embodiments

In the embodiments described above, the enclosure consists of sheet metals. However, instead of sheet metal, it may be constructed by resinous molding, etc. In this case, effects similar to the above embodiments are realized.

Further, in the above embodiments the slide arm is connected using drive gears. However, this invention is not only limited to this, as a timing belt or the like may also be used.

Further in the described above embodiments, the dial for adjustment of visibility and for adjustment of a distance between pupils is moved by hand. This invention is not only limited to this, as it may be automatically controlled by mounting drive motors. In addition in this case, in the glasses type display apparatus for seeing three-dimensional stereoscopic images etc., it may be also performed to feedback position data of the display portion, which is calculated as a position of the virtual image from image data.

Further, in the described above embodiments, as a display of the distance between pupils and a virtual image position, a scale is indicated by rotating the indicating board to read this. This invention is not only limited to this, but also the motion of the indicating board may be converted into the straightline motion by using a mechanism such as a rack and pinion or the like. Rotary angles of a gear read by such as rotary encoder may also be displayed on a display portion such as a liquid crystal display. Furthermore, movable portions, such as link, of the adjustment mechanism may be used as a scale, and it may realize similar effects to the above embodiments.

Further, in the above embodiments, a spring for the connecting portion of the head fitting member is used. However, this invention is not only limited to this, as a coil spring may be used, and a motor may be mounted instead of the spring. Further, as shown in FIG. 18, a helmet and a cap or the like may be used, instead of the band for head fitting.

Furthermore, in the above embodiments, this invention is applied to the glasses type display apparatus for virtual reality. However, this invention is not only limited to this, but also may be suitable for and applied widely to various kinds of a display apparatus, such as a computer display apparatus or the like.

(1-5) As discussed above, with this invention, the glasses type display apparatus can be realized, in which an adjustment of distance between pupils and a visibility adjustment can be executed, and regardless of this adjustment, even if changing a distance between the left and right display portions and the lens systems, positions of the left and right virtual images coincide with each other, so that every user can see fine images. Further, the virtual image display position corresponding to adjusted distance between pupils and visibility is indicated on scales to check from the outside, making it especially convenient for the user to use and adjust the apparatus.

Regarding the head fitting member, the image display portion is constructed to rotate around the temple at the center of the eye viewed from the side so that the user can see the image at a natural position. By springing up the image display portion and a portion supporting it, avoids obstruction of sight to the scene outside the apparatus. Furthermore, a predetermined weight is provided on the rear side of head, so as to reduce the burden imposed on the user's head. Thus, an improved, more convenient, and useful glasses type display apparatus is realized.

(2) Second Embodiment

Figure 21:
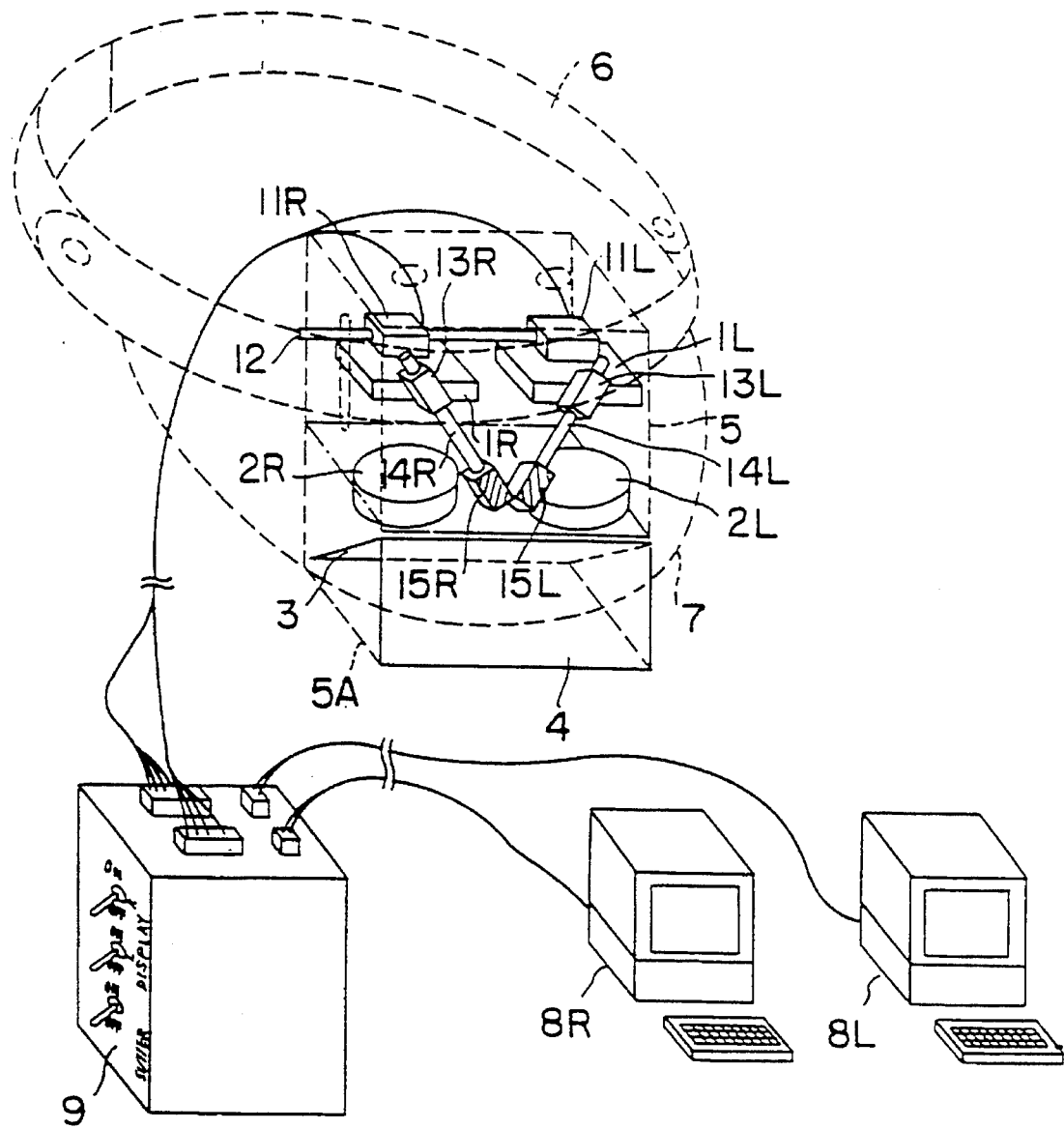
FIG. 21 is a schematic perspective view showing a configuration of the second embodiment of the glasses type display apparatus of this invention.

FIG. 21 shows a schematic view illustrating the construction of the second embodiment of the glasses type display apparatus of this invention. As shown in FIG. 21, the left and right lens systems 2L, 2R are provided corresponding to respective left and right display portions 1L, 1R. Light along the optical axes of these lens systems 2L and 2R reflects from the beam splitter 3 with a slant of 45 degrees and enters left and right eyeballs (not shown) of the user. A liquid crystal shutter 4 is positioned in front of the beam splitter 3.

The left and right display portions 1L, 1R, left and right lens systems 2L, 2R, the beam splitter 3, and the liquid crystal shutter 4 are contained in any enclosure, such as one 5 shown by broken lines. The enclosure 5 has an inside wall is made of a material for painting and frosted black so as to not reflect light, adheres to the brim portion 7 of the head fitting member 6 at the face shown by a dotted chain lines. The user wears this head fitting member 6 on his head, and can see virtual images.

The left and right image signals applied to each left and right display portions 1L, 1R, are generated by computers 8L and 8R, and these are provided to the left and right display portions 1L, 1R via a control equipment 9. Further, the control equipment 9 generates a control signal making the liquid crystal shutter 4 open or close corresponding to the operation of switches.

In this glasses type display apparatus, the left and right display portions 1L, 1R are respectively fixed to the first linear sliders 11L and 11R. These linear sliders 11L and 11R are secured to the first common slider shaft 12. The left and right display portions 1L and 1R are respectively fixed to the second linear sliders 13L and 13R. These second linear sliders 13L and 13R are respectively secured to the second and the third slider shafts 14L and 14R, and these slider shafts 14L and 14R are adhered, for example, by using an adhesive, with a predetermined angle to the enclosure 5 by fixed members 15L and 15R.

Consequently, when the first slider shaft 12 is moved up or down, the left and the right display portions 1L, 1R are neared to or parted from the left and the right lens systems 2L, 2R in order to adjustment the visibility. In addition, the up or down movement of the first slider shaft 12 changes the display portions 1L and 1R in their positions on the slider shafts 14L and 14R nearing to and parting from the left and the right lens systems 2L, 2R.

Figure 22:
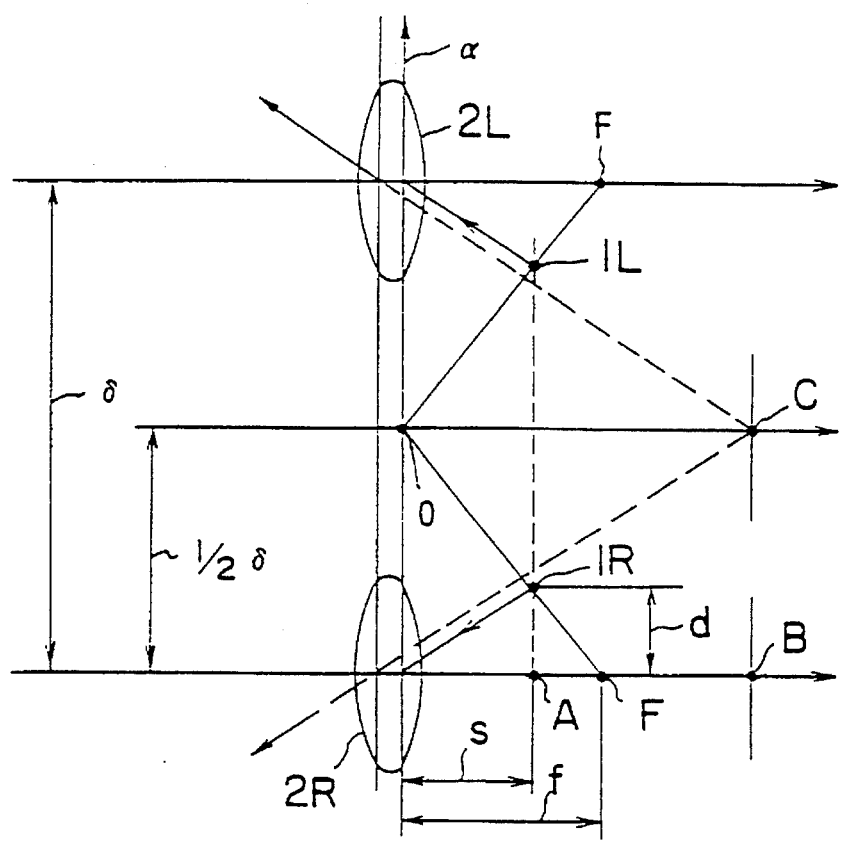
FIG. 22 is an optical distribution diagram explaining an optical system for visibility adjustment in the glasses type display apparatus of FIG. 21.

FIG. 22 depicts the optical arrangement of the left and the right display portions 1L, 1R and the left and right lens systems 2L, 2R. FIG. 22 fails to show the beam splitter 3. In FIG. 22, when the right display portion 1R is placed at a position A, a central point obtained as a result of the virtual image is formed at a point B on the optical axis of the lens system 2R. It is necessary to bring the central point of the virtual image to a point C in order to make the left and the right virtual images coincide with each other. That is, the central point moves by a distance of $\delta/2$ assuming the distance between the optical axis of the lens systems 2L and 2R is supposed $\Delta$.

It is known that the following equation is obtained $$m = \left| \frac{f}{s-f} \right| = \left| \frac{f}{f-s} \right| \quad (4)$$

Here, "m" means a transversal magnification of the virtual image, "s" means a distance between a central point A of the right display portion 1R and the main point axis $\alpha$ of the lens system 2R, and "f" means a distance between the main point axis and the focus point F. As a result, presuming that the movement distance of the right display portion 1R concerned or to be moved is "d", it is said that the movement distance of the virtual image is m×d. Thereby, following equation is obtained $$m \times d = \frac{\delta}{2} \quad (5)$$

The movement distance satisfying the equation (5) is represented as following equation:

$$d = \frac{\delta}{2} - \frac{\delta}{2f} \times s \quad (6)$$

"d" equals a segment of the line extending from the focus point F to the central point 0 on the main point axis of the left and the right lens systems. The explanation above applies similarly to the display portion 1L and the lens system 2L.

In the glasses type display apparatus of this embodiment, the second and the third slider shaft axes 14L and 14R are so positioned that the left and the right display portions 1L, 1R move along the segment line F0, it is possible to make the positions of the left and the right virtual images to be seen coincide with each other even though a visibility control changes the distance between the left and the right display portions, and the left and the right lens systems.

Further, in this glasses type display apparatus, the left and right display portions 1L, 1R and the left and right lens systems 2L, 2R are provided in the head fitting member 6, so that the left and right display portions 1L, 1R and lens systems 2L and 2R are fitted on a forehead of the user or above the left and the right eyes of the user. The beam splitter 3 slanted by about 45 degrees relative to the optical axis of the left and the right lens systems, makes the optical axis reflect, and the liquid crystal shutter 4 is placed in front of the beam splitter 3. Thereby, even though the glasses type display apparatus is fitted on the user, the user can see or observe instantly the outside field when the liquid crystal shutter 4 is open. It is also possible to watch the images of the display apparatus while simultaneously seeing any work outside of the display apparatus.

Figure 23:
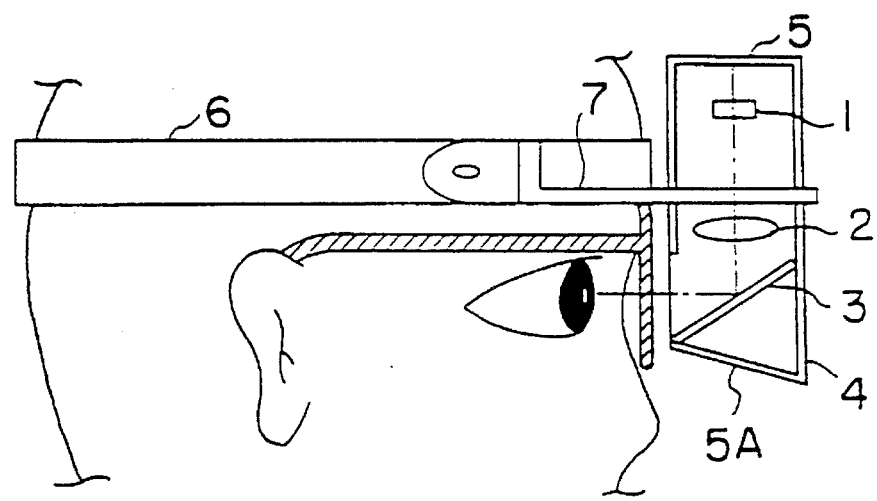
FIG. 23 is a schematic diagram showing a state where the user wears the glasses type display apparatus of FIG. 21.

Further in this glasses type display apparatus, as shown in FIG. 23, the head fitting member 6 has a brim portion 7 and the beam splitter 3 placed below the brim portion 7 separated from the face of the user by a predetermined distance. Thereby, it is possible to firmly have a downward eyesight, and the user can freely takes off and takes on a pair of glasses without taking off the glasses type display apparatus.

Further in this glasses type display apparatus, the bottom portion of the beam splitter 3 is covered with the bottom face 5A extending from the enclosure 5. Consequently, incident rays from the outside through the bottom of the beam splitter 3 can be prevented and unnecessary reflections on the left and the right display portions can be also prevented so as to improve the visibility virtual images. This bottom face 5A is placed to coincide with the seeing direction of the left and the right eyes of the user, thus, maintaining clear visibility of eyesight while seeing the outside and the range of the eyesight which is blocked.

With the above construction, when the distance between the left and right display portions 1L, 1R, and the lens systems 2L and 2R change, it is possible to make the positions of the left and right virtual images to be seen coincide with each other. Thereby, visibility can be adjusted certainly with this simple construction, thus the glasses type display apparatus of convenience can be improved.

Further, with the above construction, it is possible to have a downward eyesight view with the fitting on, and to see instantly the outside field by opening the liquid crystal shutter 4. Thereby, the user can walk while wearing the glasses type display apparatus, and can see other display etc., while working. Also the user can freely take off and put on a pair of glasses without taking off the glasses type display apparatus.

Figure 24:
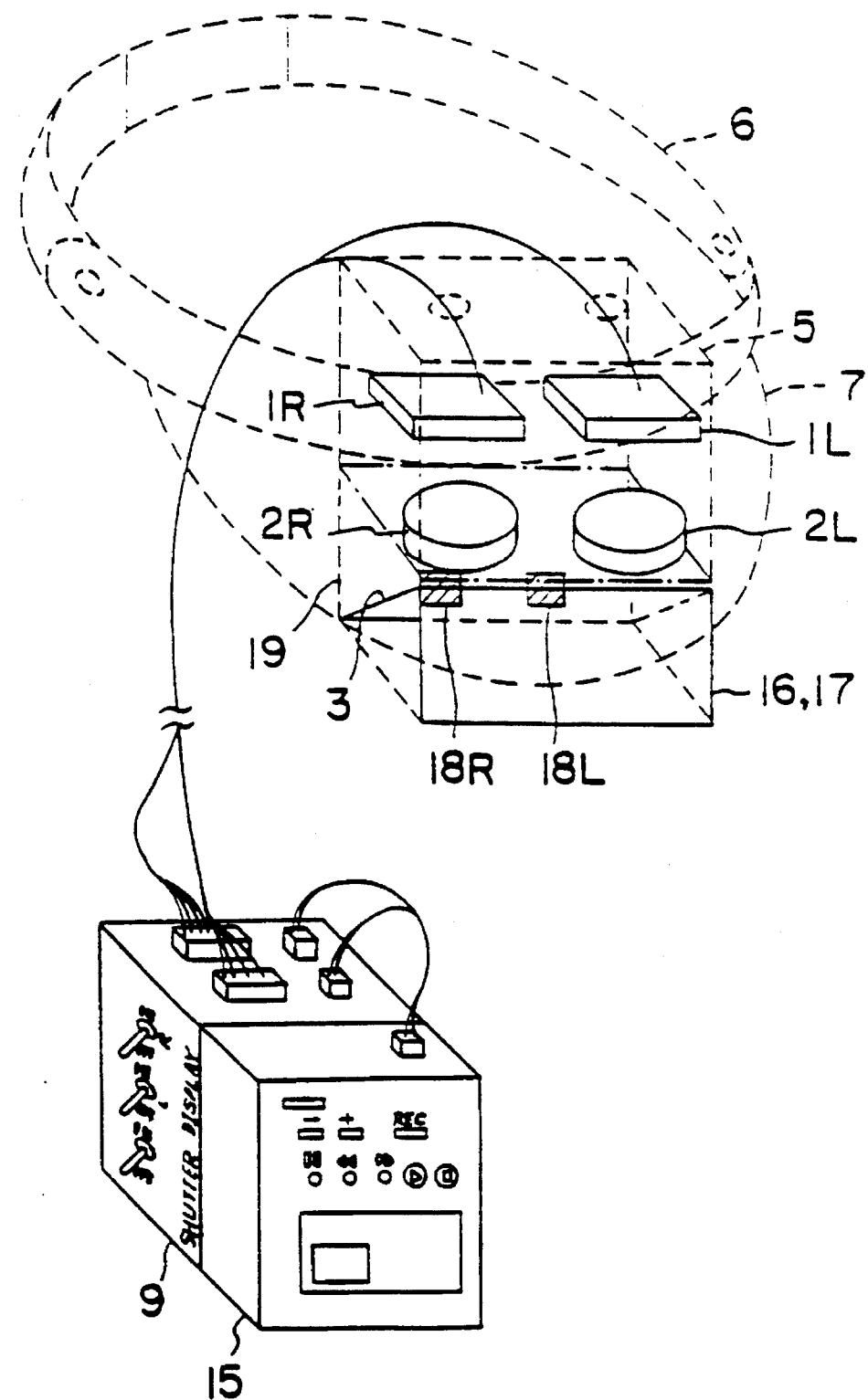
FIG. 24 is a schematic perspective view showing a configuration of the third embodiment of the glasses type display apparatus of this invention.

(3) Third Embodiment (3-1) FIG. 24 wherein corresponding portions with FIG. 21 are shown same reference numerals, depicts a schematic view of construction of the third embodiment of the glasses type display apparatus of this invention. FIG. 24 fails to show the linear sliders 11, 13L and 13R, the slider shafts 12, 14L and 14R, and visibility adjustment mechanism of FIG. 21.

In this glasses type display apparatus, a liquid crystal enclosure glass 16 and a polarization filter 17 are positioned at the position of the liquid crystal shutter 4 of FIG. 21. The left and right polarization filter 18L and 18R are positioned between the beam splitter 3 and the eyeballs by adhering to a transparent plastic board 19. Practically, the transparent plastic board 19 around thereof is fixed to adhere to the enclosure 5.

Further, a control equipment of this glasses type display apparatus, a video signal of which for example, a small video tape recorder 15 (hereinafter referred to as "small VTR 15") is provided instead of computers 8L and 8R, so as to see video images. Further, the control equipment 9 and the small VTR 15 etc., are fixed to make one body, in order to carry, by fixing to the user's belt or hanging on his shoulder.

Figure 25A:
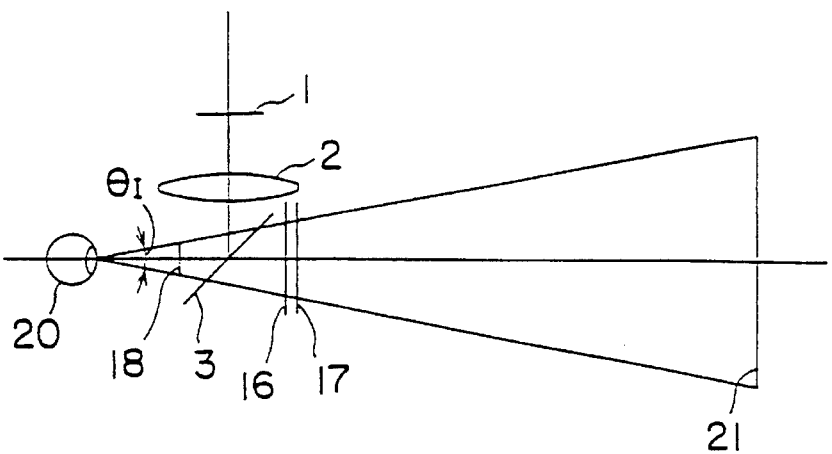
FIGS. 25A and 25B are optical system diagrams explaining a virtual image display area in the glasses type display apparatus of FIG. 24.
Figure 25B:
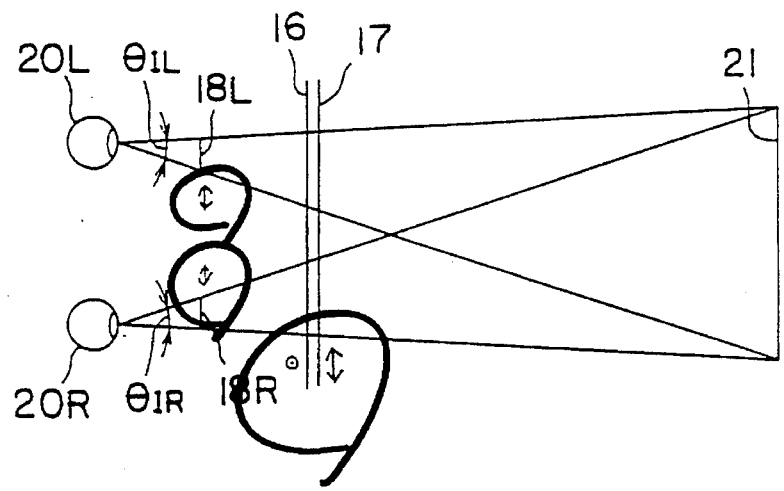

A section taken along the lens optical axis, and a section taken along a plane AA' depict respectively in FIGS. 25A and 25B, optical arrangements of the left and the right display portions 1L, 1R, the left and right lens systems 2L, 2R, the left and the right polarization filters 18L, 18R, the liquid crystal enclosure glass 16 and the polarization filter 17, in the glasses type display apparatus.

In this glasses type display apparatus, wherein the left and the right display portions 1L, 1R consist of polarized light generating type displays, a displayed image is magnified by convex lenses of the left and right lens systems 2L, 2R, and then reflected by the beam splitter 3 to the eyeballs 20, so that a vertical image 21 of the left and the right display portions 1L, 1R are displayed in front of the eyeballs 20.

The liquid crystal shutter has a polarization filter 18 positioned between the eyeballs 20 and the beam splitter 3. The liquid crystal enclosure glass 16 and the polarization filter 17 are positioned in front of the beam splitter 3. Size of the polarization filter 18 and its position are determined in an area of a visual field angle $\theta_I$ ($\theta_{IR}$, $\theta_{IL}$) of left and right eyeballs 20R, 20L respectively seen the vertical image 21, thereby hiding only the outside in the area of visual field angle of the vertical images.

The polarization filters 18L and 18R are placed separately for the left and the right eyeballs 20L, 20R respectively, so that the outside of another eye is not hidden excessively. The polarization directions of the polarization filters 18L and 18R coincide with each other, and the direction is made to coincide with a polarization direction of the display portion 1. Thereby, even though the virtual image 21 is seen through the polarization filters 18L and 18R, there is little extinction of the virtual image 21 by the polarization filters 18L and 18R.

Figure 26A:
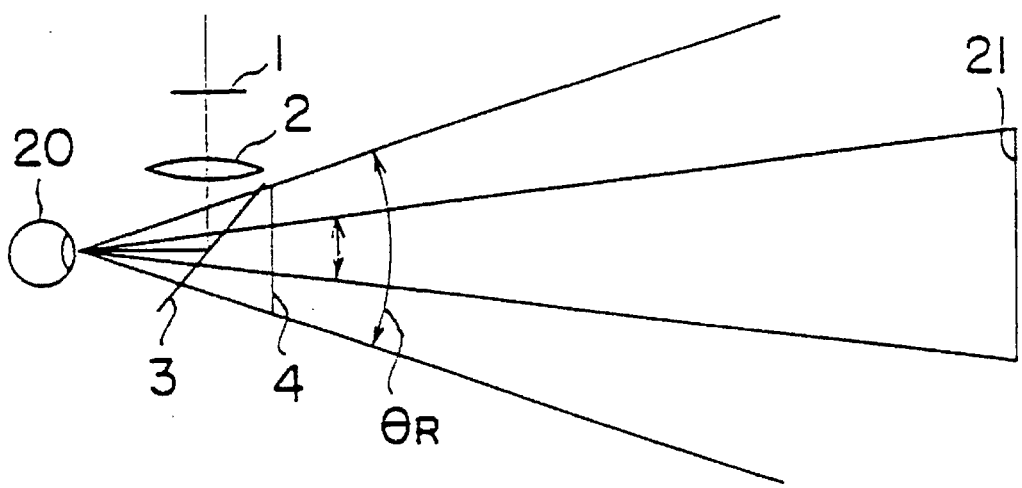
FIGS. 26A and 26B are optical system diagrams explaining a virtual image display area in the glasses type display apparatus of FIG. 21.
Figure 26B:
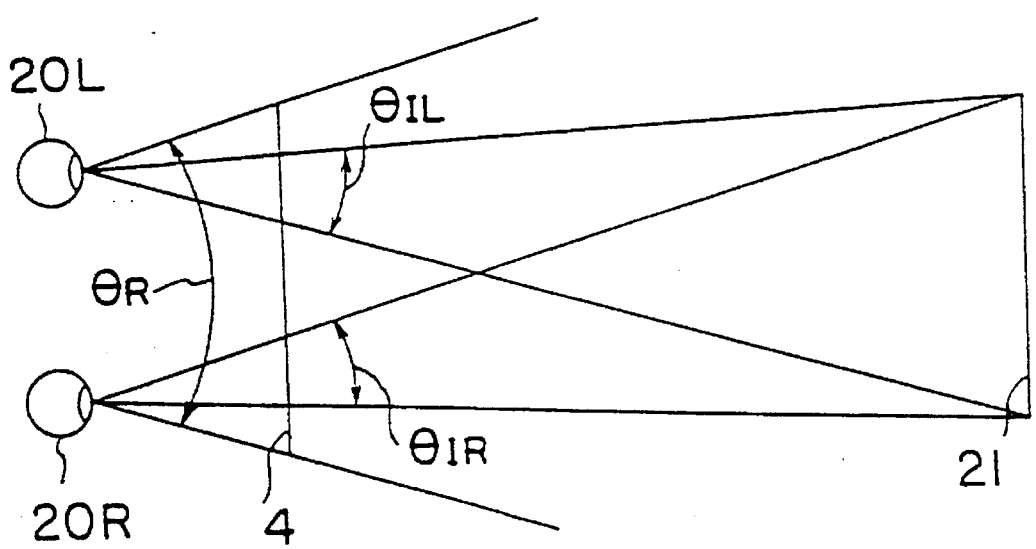

FIGS. 26A and 26B depict; a relation between an intercept area of the outside by the liquid crystal shutter 4 of the glasses type display apparatus and a visual field angle of the vertical image. Practically, in intercepting state of the liquid crystal shutter 4 as shown ill FIGS. 26A and 26B, the outside front visual field is almost totally intercepted, thus prohibiting while working the taking of information from the outside. on the contrary, in this second embodiment, only the outside in the displayed area of the virtual image 21 is hidden, thus it is possible to look around, thereby, the virtual image 21 can be seen while doing other work.

Further, by only seeing the virtual image 21, and shutting off the visual field of the outside, people often feel dizzy and feel sick from losing the sense of equilibrium, especially when they move their heads. On the contrary, in this second embodiment, the visual field is not completely closed space, only the field corresponding to the virtual image 21, so that even though a user moves his head, a disorder of the sense of equilibrium is not being generated.

With the above construction, the glasses type display apparatus can be realized having a visibility controlled certainly with a simple construction. In the glasses type display apparatus, only the outside in the display area of the virtual image 21 is hidden by the crystal shutter consisting of the polarization filters 17, 18 and the liquid crystal enclosure glass 16, allowing a user to look around, thus the virtual image 21 can be seen while doing other work, and a disorder of the sense of equilibrium is not being generated when the head is moved.

(3-2) Other Embodiments

In the above third embodiment, the area hiding the outside is determined by the polarization filter 18 placed between eyeballs 20 and the beam splitter 3. However, this invention is not only limited, but also the area hiding the outside field may be set by the polarization filter 17' in front of the beam splitter 3 and the liquid crystal enclosure glass 16.

Figure 27A:
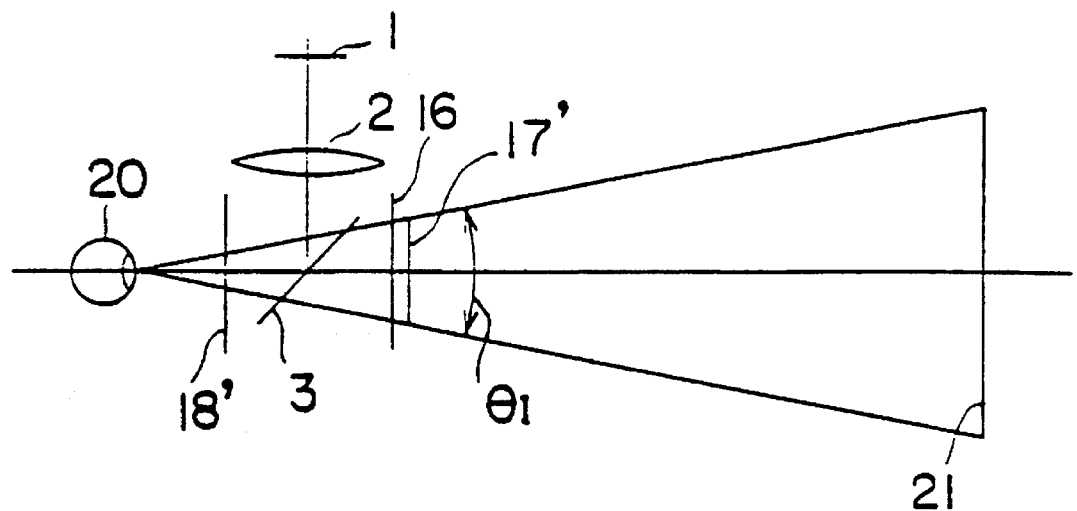
FIGS. 27A and 27B are optical distribution diagrams explaining a virtual image display area in the glasses type display apparatus of the first embodiment.
Figure 27B:
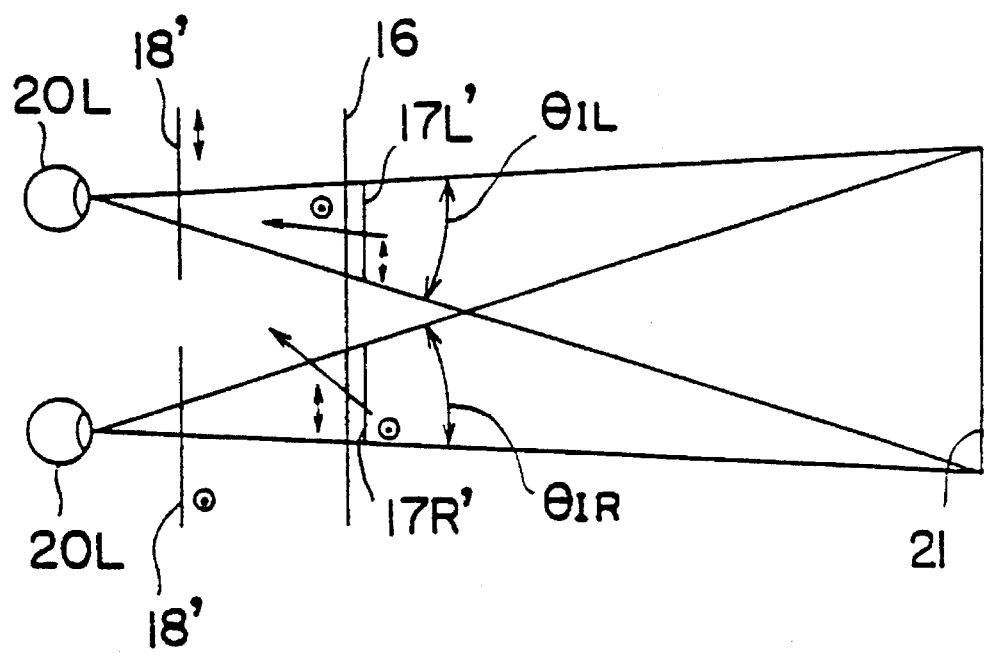

In this connection, as shown in FIGS. 27A and 27B, in which the same reference numerals denote portions corresponding to FIGS. 25A and 25B, a polarization filter 18' placed between eyeballs 20 and the beam splitter 3 is enlarged to be satisfactory, and the polarization filter 17' placed in front of the liquid crystal enclosure glass 16 is set as large as the display area of the vertical images. A polarization direction of the polarization filter 17' and a polarization direction after passing the liquid crystal enclosure glass 16, are set in parallel or vertical with respects to the plane of the drawing sheet.

The polarization directions of the left and the right display portions 1L, 1R respectively coincide with the polarization directions of the left and the right polarization filter 17' (17L', 17R'), so that the lights of the left and the right display portions 1L, 1R are reached to the left and right eyeballs 20L and 20R. By constituting it like this, for example, with respect to the left eyeball 20L, a light passed through the polarization filter 17L' in front of the left eyeball 20L, does not reach the left eyeball 20L, so as to hide the outside field in the visual field area of the virtual image.

On the contrary, a light passed through the polarization filter 17R in front of the right eyeball 20R, reaches the left eyeball 20L. Therefore, only the outside of the virtual image area in front of the left eyeball 20L can be hidden, and the right eyeball 20R one can be applied too. Thereby, only the outside of the virtual area in front of the left and right eyeballs 20L, 20R are respectively hidden.

Further in the above embodiments, this invention is applied to the glasses type display apparatus for virtual reality. However, this invention is not only limited to this, but also is applicable widely to kinds of display apparatus, for example, a computer etc.

(3-3) As described above, the glasses type display apparatus can be realized wherein, a visibility control can be performed certainly to coincide with left and right virtual images each other, despite changing distances between the left and the right display portions and the lens systems. Further, it is possible to change glasses while using the apparatus, and to obtain a field of view under visual field, so as to walk in the glasses type display apparatus, and see other displays or the like while working.

Further, only the outside within the display area of the virtual image is hidden by intercept means, allowing a user to look around and to see the virtual image while doing other work. Furthermore, a glasses type display apparatus is realized where the user does not feel a loss of the sense of equilibrium even when moving his head, thus improving convenience and comfort for the user.

While certain novel features have been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A glassed type display apparatus for displaying an image including left and right virtual images generated by respective left and right display means and transmitted through respective left and right lens systems, said left and right lens systems each having a corresponding focal point and each being disposed symmetrically with respect a center point of a main point axis, said glasses type display apparatus comprising:

left and right slide means for moving respective left and right display means with respect to said left and right lens systems along corresponding left and right segment lines, each segment line extending through said center point of said main point axis and the focal point of a corresponding left or right lens system; and a beam splitter located in front of eyes of a user, said beam splitter having a predetermined inclination with respect to optical axes of said left and right lens systems.

2. A glasses type display apparatus for displaying an image including left and right virtual images generated by respective left and right display means and transmitted through respective left and right lens systems, said left and right lens systems each having a corresponding focal point and each being disposed symmetrically with respect to a center point of a main point axis, said glasses type display apparatus comprising:

moving means for moving said left and right lens systems symmetrically with respect to each other about said center point;

slide means for moving said left and right display means along corresponding left and right segment lines, each segment line extending through said center point of said main point axis and the focal point of a corresponding left or right lens system; and linking means for operatively connecting said moving means and said slide means so that movement of said left and right lens systems by said moving means causes said slide means to move said display means along said left and right segment lines.

3. A glasses type display apparatus according to claim 1, wherein, said left and right slide means move said right and left display means along said left and right segment lines, whereby, said left and right virtual images remain coincident with one another over a range of movement between said left and right display means and said left and right lens systems.

4. A glasses type display apparatus according to claim 2, wherein, said linking means moves in response to movement of at least said slide means or said moving means, whereby, said left and right virtual images remain coincident with one another over a range of movement between said left and right display means and said left and right lens systems and between said left and right display means relative to each other and said left and right lens systems relative to each other.

5. A glasses type display apparatus according to claim 2, further comprising head fitting means for supporting said left and right lens systems and said left and right display means and for enabling said lens systems and display means to be pivoted up and away from the face of a user wearing said head fitting means.

6. A glasses type display apparatus according to claim 1, further comprising head fitting means for pivotally supporting said left and right lens systems and said left and right display means and for enabling said lens systems and display means to be moved toward and away from the face of a user and pivoted up and away from the face of the user while wearing said head fitting means.

7. A glasses type display apparatus according to claim 2, further comprising pupil distance scale means for indicating said distance between eyeballs of a user, said scale means being connected to said moving means and responsive to a symmetric motion of said left and right lens systems.

8. A glasses type display apparatus according to claim 7, further comprising:

adjusting means operatively connected with said moving means and responsive to a manually manipulatable member for adjusting said distance between said left and right lens systems;

said adjusting means being connected to said pupil scale means.

9. A glasses type display apparatus according to either claim 1 or 2, further comprising virtual image position scale means for indicating a display position of said virtual image, said display position corresponding to the distance between said left and right display means and said left and right lens systems.

10. A glasses type display apparatus according to claim 9, further comprising:

means for moving said left and right display means toward or away from said left and right lens systems; and adjusting means for adjusting said distance between said left and right display means and said left and right lens systems;

said adjusting means being connected to said virtual image position scale means.

11. A head mountable display apparatus according to claim 9, comprising head fitting means for pivotally supporting the glasses type display apparatus.

12. A head mountable display apparatus according to claim 11, wherein, said head fitting means comprises:

support means for supporting said glasses type display apparatus in front of the face of user; and pivot means connected to said support means for pivotally supporting said support means in a manner wherein said support means is pivotal about an axis which passes substantially through a center of an eyeball of a user when said head fitting means is worn by the user.

13. A head mountable display apparatus according to claim 11, wherein, said head fitting means further comprises means for pivotally supporting said glasses type display apparatus so that said glasses type display apparatus may be pivoted upward and moved away from the face of a user wearing said head fitting means.

14. A head mountable display apparatus of claim 11, wherein said head fitting means further comprises:

support means for supporting said glasses type display apparatus; and spring-mounted means connected to said support means for moving said support means so that it can spring clear of the eyes of a user.

15. A head mountable display apparatus of claim 14, wherein said head fitting means comprises:

head band means having front and rear portions;

a balance weight disposed at said rear portion, said glasses type display apparatus being connected to said front portion, said balance weight having a weight which corresponds to a weight of said glasses type display apparatus so as to produce a balancing effect.

16. A head mountable display apparatus comprising head fitting means for pivotally supporting the glasses type display apparatus of any one of claims 1 to 4 and 7.

17. A head mountable display apparatus according to claim 16, wherein, said head fitting means comprises:

support means for supporting said glasses type display apparatus in front of the face of user; and pivot means connected to said support means for pivotally supporting said support means so that said support means is pivotal about an axis which passes substantially through a center of an eyeball of a user when said head fitting means is worn by the user.

18. A head mountable display apparatus according to claim 16, wherein, said head fitting means further comprises means for pivotally supporting said glasses type display apparatus so that said glasses type display apparatus can be pivoted upward and moved away from the face of a user wearing said head fitting means.

19. A head mountable display apparatus of claim 16, wherein said head fitting means comprises:

head band means having front and rear portions;

a balance weight disposed at said rear portion, said glasses type display apparatus being connected to said front portion, said balance weight having a weight which corresponds to a weight of said glasses type display apparatus.

20. A head mountable display apparatus of claim 16, wherein said head fitting means further comprises:

support means for supporting said glasses type display apparatus; and spring-mounted means connected to said support means for moving said support means so that it can spring clear of the eyes of a user.

21. A head mountable display apparatus of claim 20, wherein said head fitting means comprises:

head band means having front and rear portions;

a balance weight disposed at said rear portion, said glasses type display apparatus being connected to said front portion, said balance weight having a weight which corresponds to a weight of said glasses type display apparatus so as to produce a balancing effect.

22. A glasses type display apparatus to any of claims 1 to 4, further comprising:

a head fitting member for supporting said left and right display portions and said left and right lens systems at a level higher than a user's eyes; and extinction means located in front of said beam splitter for blocking at least an external visual field corresponding to said left and right virtual images.

23. A glasses type display apparatus of claim 22, wherein said head fitting member has a brim, and wherein said beam splitter is located at a position which is below said brim and separated from a face of said user by a predetermined distance.

24. A glasses type display apparatus of claim 23, wherein a bottom connected to an enclosure covers the lower portion of said beam splitter.

25. A glasses type display apparatus of claim 22, wherein a bottom connected to an enclosure covers the lower portion of said beam splitter.

26. A glasses type display apparatus of claim 24, wherein said bottom connected to said enclosure has a face which parallel a direction of an open field of view of said user.

27. A glasses type display apparatus for displaying a virtual image produced using left and right lens systems and corresponding left and right display means, comprising:

a head fitting member for supporting said left and right display means and said left and right lens systems, above a level of a user's eyes;

a beam splitter located below said left and right lens systems and in front of the eyes of said user, said beam splitter having a predetermined inclination with respect to optical axes of said left and right lens systems; and shutter means for blocking out all of the outside field of view corresponding to a display area occupied by said virtual image.

28. A glasses type display apparatus of claim 27, wherein said head fitting member has a brim, and wherein said beam splitter is located at a position below said brim and separated from a face of said user by a predetermined distance.

29. A glasses type display apparatus of claim 28, wherein a bottom connected to an enclosure covers the lower portion of said beam splitter.

30. A glasses type display apparatus of claim 29, wherein said bottom connected to said enclosure has a face which parallels a direction of an open field of view of said user.

31. A glasses type display apparatus as set forth in claim 2, further comprising a beam splitter, said beam splitter being located in front of the user's eyes and slanted with a predetermined inclination with respect to optical axes of said left and right lens systems.

32. A glasses type display apparatus comprising:

left and right lens systems;

left and right horizontally arranged display means which are located directly above said left and right lens systems, said left and right display means producing left and right images which are projected vertically downward from said left and right display means to said left and right lens systems;

a beam splitter located below said left and right lens systems and in front of the eyes of said user, said beam splitter having a predetermined inclination with respect to optical axes of said left and right lens systems;

shutter means associated with said beam splitter for blocking out all of the outside field of view corresponding to display area occupied by a virtual image created by said left and right images;

first adjustment means associated with said left and right display means for moving said left and right display means diagonally with respect to said left and right lens systems so that as the distance between said left and right display means and the left and right lens systems increases the distance between the left and right display means also increases; and second adjustment means for adjusting the distance between said left and right lens systems by moving said left and right lens systems laterally with respect to each other, said second adjusting means being operatively connected with said first adjusting means so that as the distance between said left and right lens systems varies diagonal movement of said left and right display means is induced.

* * * * *